United States Patent
Kothinti Naresh et al.

(10) Patent No.: US 11,061,683 B2
(45) Date of Patent: Jul. 13, 2021

(54) LIMITING REPLAY OF LOAD-BASED CONTROL INDEPENDENT (CI) INSTRUCTIONS IN SPECULATIVE MISPREDICTION RECOVERY IN A PROCESSOR

(71) Applicant: Microsoft Technology Licensing, LLC, Redmond, WA (US)

(72) Inventors: Vignyan Reddy Kothinti Naresh, Morrisville, NC (US); Shivam Priyadarshi, Morrisville, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 16/440,062

(22) Filed: Jun. 13, 2019

(65) Prior Publication Data

US 2020/0394040 A1 Dec. 17, 2020

(51) Int. Cl.
*G06F 9/38* (2018.01)
*G06F 9/30* (2018.01)

(52) U.S. Cl.
CPC ........ *G06F 9/3861* (2013.01); *G06F 9/30043* (2013.01); *G06F 9/3826* (2013.01); *G06F 9/3834* (2013.01); *G06F 9/3838* (2013.01); *G06F 9/3802* (2013.01); *G06F 9/3846* (2013.01); *G06F 9/3867* (2013.01)

(58) Field of Classification Search
CPC ..... G06F 9/3861; G06F 9/3826; G06F 9/3834
See application file for complete search history.

(56) References Cited

U.S. PATENT DOCUMENTS

| 2005/0138480 | A1* | 6/2005 | Srinivasan | G06F 9/3842 714/38.1 |
| 2005/0247774 | A1* | 11/2005 | Sander | G06F 9/3842 235/375 |
| 2006/0150161 | A1* | 7/2006 | Onder | G06F 9/384 717/127 |

(Continued)

OTHER PUBLICATIONS

Al-Zawawi, et al., "Transparent Control Independence (TCI)", In Proceedings of the 34th Annual International Symposium on Computer Architecture, Jun. 9, 2007, pp. 448-459.

(Continued)

*Primary Examiner* — William B Partridge
(74) *Attorney, Agent, or Firm* — Withrow & Terranova, PLLC

(57) ABSTRACT

Limiting replay of load-based control independent (CI) instructions in speculative misprediction recovery in a processor. In misprediction recovery, load-based CI instructions are designated as load-based CI, data dependent (CIDD) instructions if a load-based CI instruction consumed forwarded-stored data of a store-based instruction. During the misprediction recovery, replayed load-based CIDD instructions will reevaluate an accurate source of memory load the correct data instead of consuming potentially faulty data that may have been forwarded by a store-based instruction that may have only existed in a mispredicted instruction control flow path. Limiting the replay of load-based CI instructions to only determined CIDD load-based instructions can reduce execution delay and power consumption in an instruction pipeline.

29 Claims, 18 Drawing Sheets

(56) References Cited

U.S. PATENT DOCUMENTS

| | | | |
|---|---|---|---|
| 2010/0306509 A1* | 12/2010 | Day | G06F 9/3838 |
| | | | 712/217 |
| 2011/0040955 A1* | 2/2011 | Hooker | G06F 9/3861 |
| | | | 712/225 |
| 2015/0089186 A1* | 3/2015 | Kim | G06F 12/0215 |
| | | | 711/213 |

OTHER PUBLICATIONS

"International Search Report and Written Opinion Issued in PCT Application No. PCT/US20/030162", dated Aug. 18, 2020, 15 Pages.

Rotenberg, et al., "Control Independence in Trace Processors", In Proceedings of the 32nd Annual ACM/IEEE International Symposium on Microarchitecture, Nov. 16, 1999, pp. 4-15.

* cited by examiner

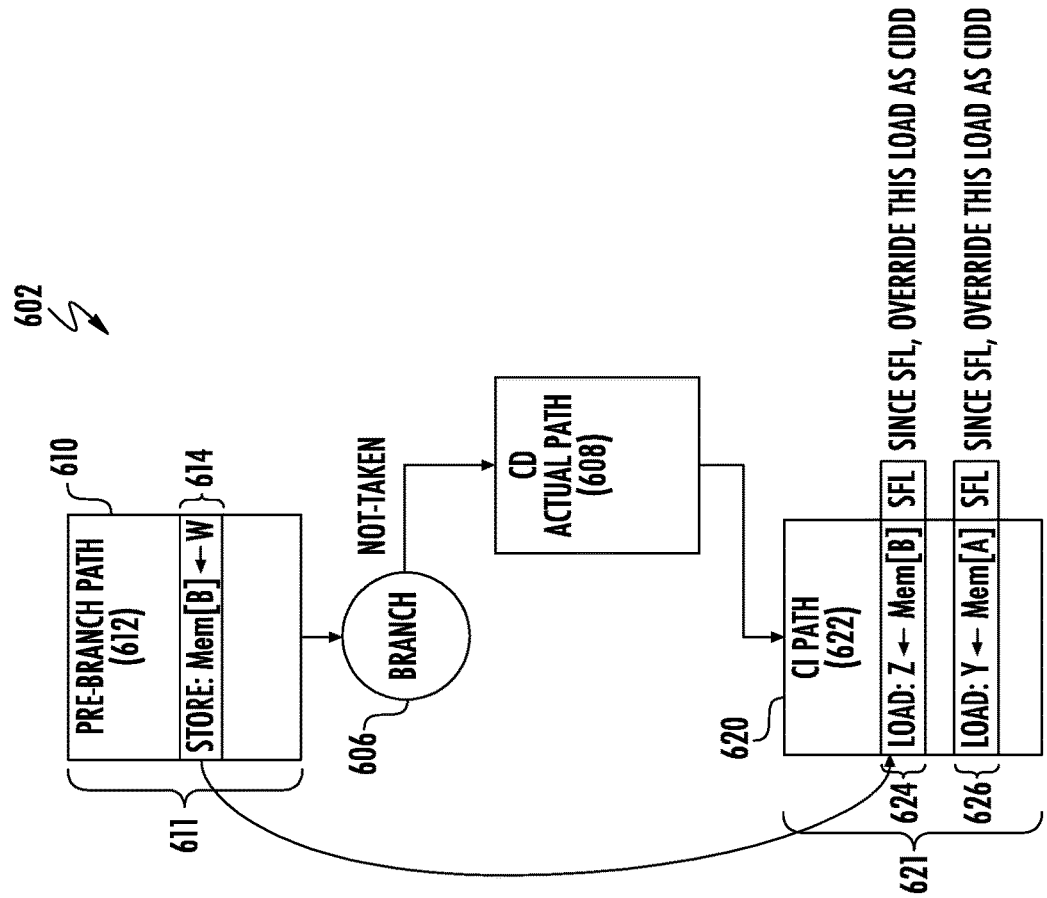
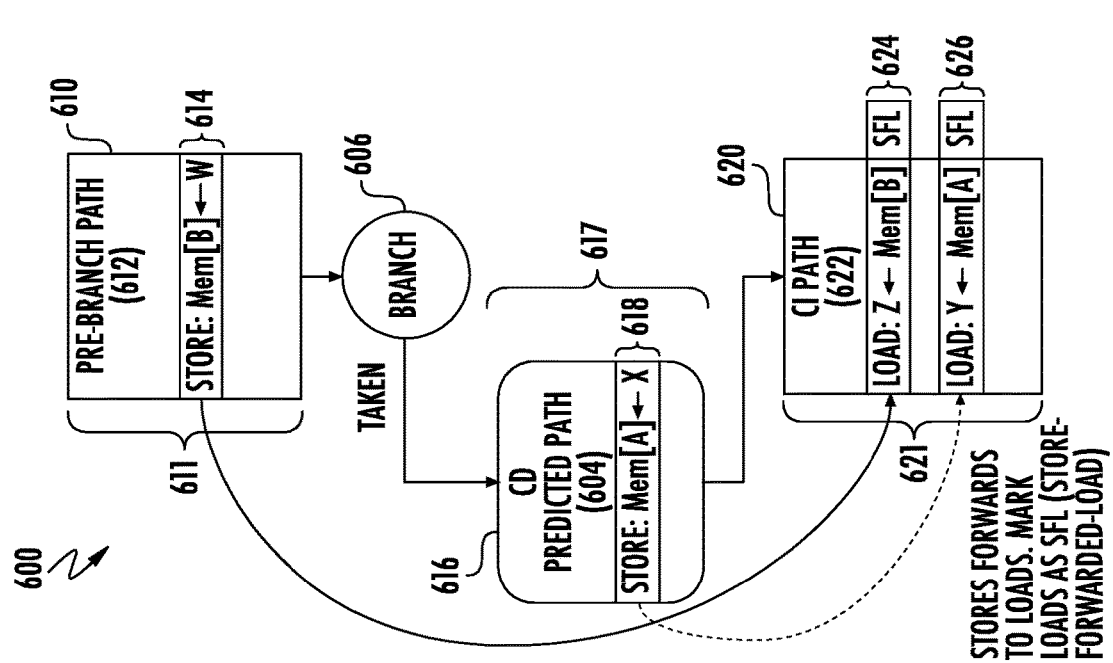
FIG. 6B
FIG. 6A

STORE-FORWARD TRACKING MEMORY (1000)

| | LOAD ID | SFL | FSID |
|---|---|---|---|
| 1002(0) | 15 | 1 | 1 |
| 1002(1) | 10 | 0 | 0 |
| 1002(2) | 17 | 0 | 0 |
| ⋮ | | | |
| | 20 | 1 | 7 |
| | ⋮ | ⋮ | ⋮ |
| 1002(N) | | | |

Columns: 1004 (LOAD ID), 1006 (SFL), 1008 (FSID)

*FIG. 10*

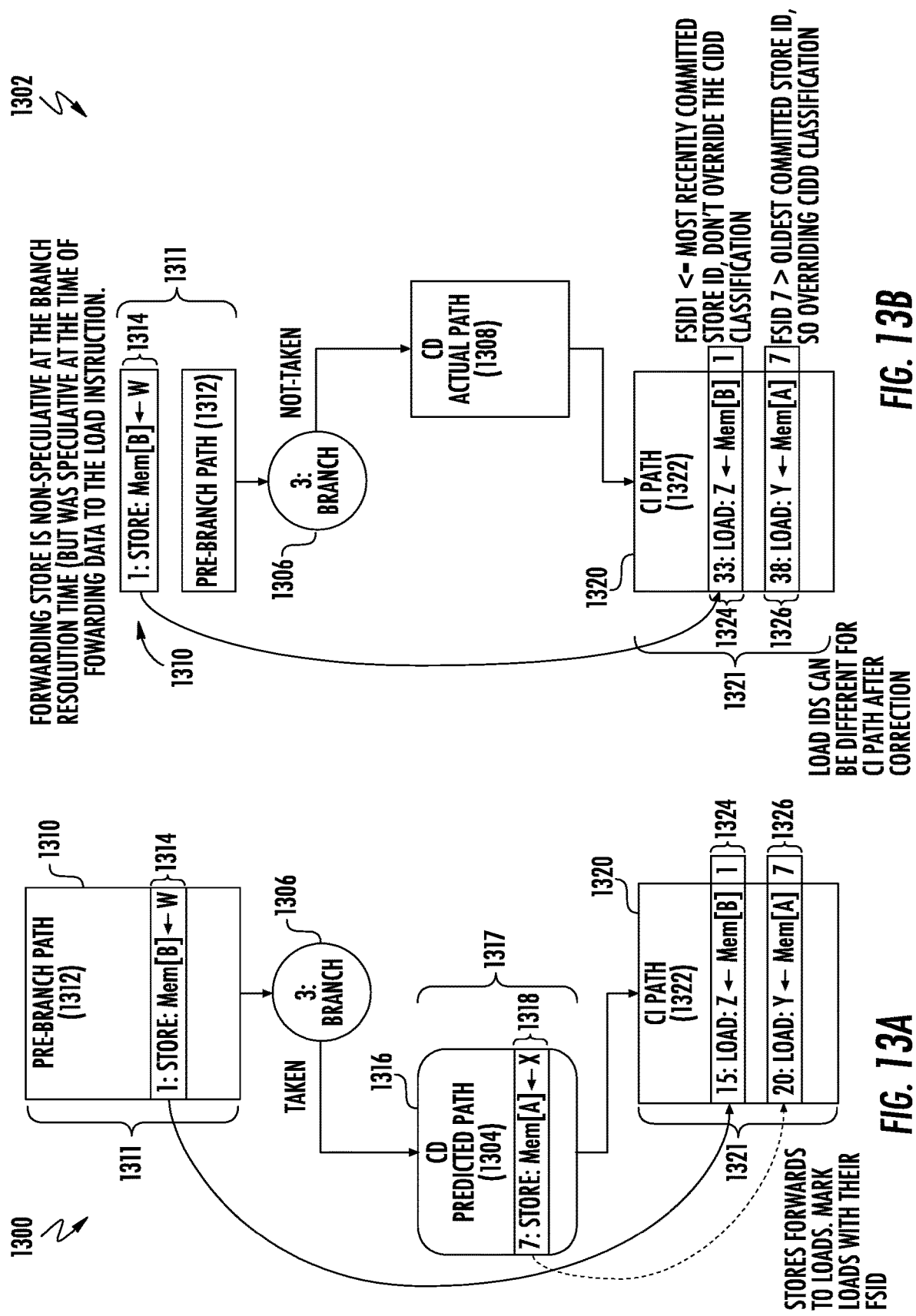

STORE-FORWARD
TRACKING MEMORY
(1500)

| | STORE ID 1504 | VALID 1506 | LOAD LIST 1508 | OVERFLOW 1510 |
|---|---|---|---|---|
| 1502(0) | 1 | 1 | 15 | 0 |
| 1502(1) | 2 | 0 | 3, 5 | 0 |
| 1502(2) | 6 | 0 | 7, 8 | 1 |
| ⋮ | | | | |
| | 7 | 0 | 20 | |
| | | | | |
| 1502(N) | | | | |

*FIG. 15*

LIMITING REPLAY OF LOAD-BASED CONTROL INDEPENDENT (CI) INSTRUCTIONS IN SPECULATIVE MISPREDICTION RECOVERY IN A PROCESSOR

FIELD OF THE DISCLOSURE

The technology of the disclosure relates generally to speculative prediction of control flow computer instructions ("instructions") in an instruction pipeline of a processor, and more particularly to misprediction recovery after a speculative prediction of a control flow instruction is resolved at execution as a misprediction.

BACKGROUND

Instruction pipelining is a processing technique whereby the throughput of computer instructions being executed by a processor may be increased by splitting the handling of each instruction into a series of steps. These steps are executed in an execution pipeline composed of multiple stages. Optimal processor performance may be achieved if all stages in an execution pipeline are able to process instructions concurrently and sequentially as the instructions are ordered in the instruction pipeline(s). However, structural hazards can occur in an instruction pipeline where the next instruction cannot be executed without leading to incorrect computation results. For example, a control hazard may occur as a result of execution of a control flow instruction that causes a precise interrupt in the processor. One example of a control flow instruction that can cause a control hazard is a conditional branch instruction. A conditional control instruction, such as a conditional branch instruction, may redirect the flow path of instruction execution based on conditions evaluated when the condition of the control branch instruction is executed. As a result, the processor may have to stall the fetching of additional instructions until a conditional control instruction has executed, resulting in reduced processor performance and increased power consumption.

One approach for maximizing processor performance involves utilizing a prediction circuit to speculatively predict the result of a condition that will control the instruction execution flow path. For example, the prediction of whether a conditional branch instruction will be taken can be based on a branch prediction history of previous conditional branch instructions. When the control flow instruction finally reaches the execution stage of the instruction pipeline and is executed, the resultant target address of the control flow instruction is verified by comparing it with the previously predicted target address when the control flow instruction was fetched. If the predicted and actual target addresses match, meaning a correct prediction was made, delay is not incurred in instruction execution, because the subsequent instructions at the target address will have been correctly fetched and already be present in the instruction pipeline when the conditional branch instruction reaches an execution stage of the instruction pipeline. However, if the predicted and actual target addresses do not match, a mispredicted branch hazard occurs in the instruction pipeline that causes a precise interrupt. As a result, the instruction pipeline is flushed and the instruction pipeline fetch unit is redirected to fetch new instructions starting from the target address, resulting in delay and reduced performance. This is also known as the "misprediction penalty." Also, stages in the execution pipeline may remain dormant until the newly fetched instructions make their way through the instruction pipeline to the execution stage, thereby reducing performance. Misprediction in the processing of instructions in a processor is costly in terms of the resulting delay and reduced performance.

One method is to lower the misprediction penalty by utilizing control independence (CI). CI refers to a region of instructions that executes regardless of an instruction control flow path direction. In other words, CI instructions are independent of the control decision by a branch. This is shown by example in an instruction stream 100 in FIG. 1 illustrated in the form of a flowchart 102. The instruction stream 100 includes a conditional branch instruction 104. The instruction execution flow path will either take flow path 106(1) or flow path 106(2) depending on the resolution of the condition (i.e., predicate) in the conditional branch instruction 104. A processor can speculatively predict the outcome of the predicate before the conditional branch instruction 104 reaches an execution stage in the instruction pipeline and go ahead and insert instructions in the predicted flow path into the instruction pipeline to be executed to avoid processing delay. Instructions 108(1), 108(2) that are in one of the two respective instruction control flow paths 106(1), 106(2) in a respective control dependent (CD) region 110(1), 110(2) of the instruction stream 100 are "control dependent" (CD) instructions 108(1), 108(2). CD instructions are instructions that are only executed dependent on the flow path 106(1), 106(2) taken based on the resolution of the predicate in the conditional branch instruction 104. There are other instructions 112 in a control independent (CI) region 114 in the instruction stream 100 that are inserted in the instruction pipeline to get executed regardless of which instruction control flow path 106(1), 106(2) is taken as a result from the conditional branch instruction 104. These instructions 112 are also known CI instructions 112. The CI instructions 112 can be further classified based on their data dependence on instructions 108(1) or 108(2) in the flow path 106(1), 160(2) taken in a respective CD region 110(1) or 110(2). If a CI instruction (e.g., a load instruction) is dependent on data produced by an instruction 108(1) or 108(2) (e.g., a store instruction) in a CD region 110(1) or 110(2) of the instruction stream 100, the CI instruction is a CI data dependent (CIDD) instruction 112D; otherwise, it is a CI, data independent (CIDI) instruction 112I.

CI techniques performed when executing the instructions in the instruction stream 100 in FIG. 1 require identification of the CIDD instructions among the CI instructions 112 in the CI region 114 of the instruction stream 100. This is so that the CIDD instructions 112D can be re-executed as part of a misprediction recovery to guarantee functional correctness. This is because while the CIDD instructions 112D in the CI instructions 112 are inserted in the instruction pipeline to be executed by a processor regardless of the flow path 106(1), 106(2) taken, the CD instructions 108(1) or 108(2) that were executed based on speculative prediction of the conditional branch instruction 104 will not be executed in misprediction recovery. Instead, the CD instructions 108(1) or 108(2) that were not executed based on speculative prediction of the conditional branch instruction 104 will be executed in misprediction recovery. This means that the data produced by the CD instructions 108(1), 108(2) that were executed based on a speculative misprediction and consumed by CIDD instructions 112D may not be accurate. The misprediction recovery effectively adds CD produced data from the CD instructions 108(1) or 108(2) that are executed in misprediction recovery. Thus, the misprediction recovery effectively "removes" the CD instructions 108(1) or 108(2)

that were executed based on speculative misprediction, thus effectively removing their CD produced data. Thus, any load-based CIDD instructions 112D that were executed based on the speculative misprediction may have been based on stored CD data that was removed and/or other store CD data added. A load-based instruction is any instruction that performs a load operation to retrieve data from memory into a register. To address the issue of CIDD instructions 112D having been executed based on later removed CD data in misprediction recovery, the processor can mark all load-based CI instructions 112 to be re-executed in misprediction recovery. In this manner, any added stored CD data that affects a load-based CIDD instruction 112D will be used in re-execution of the load-based CIDD instructions 112D in misprediction recovery.

SUMMARY

Exemplary aspects disclosed herein include limiting replay of load-based control independent (CI) instructions in speculative misprediction recovery in a processor, and related methods. The processor is configured to speculatively predict the outcome of a condition (i.e., predicate) of conditional control instructions (e.g., conditional branch, conditional call, conditional return, branch table instructions) to pre-fetch instructions in a predicted instruction control flow path into an instruction pipeline to be processed to reduce instruction fetch delay. In exemplary aspects, in a misprediction recovery, a processor is configured to identify load-based CI instructions in an instruction pipeline having a store-forward data dependency between a store-based control dependent (CD) instruction and the load-based CI instruction as CI, data dependent (CIDD) instructions. CIDD instructions are replayed in misprediction recovery since these instructions were executed based on consuming stored data from a store-based CD instruction in the incorrect instruction control flow path, and thus the consumed stored data may have been inaccurate. CD instructions are instructions that get executed dependent on the instruction control flow path taken based on the resolution of a predicate in the conditional control instruction. CI instructions are instructions that get executed regardless of the instruction control flow path taken as a result of a conditional control instruction. CI instructions that do not consume data based on data produced from a CD instruction are CI, data independent (CIDI) instructions. CI instructions that consume data based on data dependence from a CD instruction are CIDD instructions. A CIDD instruction can have a register dependency where the dependency between instructions is known via the producer and consumer of a register. A load-based CIDD instruction can have a memory dependency where the dependency between instructions is based on a producer producing a result to a memory location that is consumed by a consumer. While register dependency of a CIDD instruction can more easily be checked during instruction processing, a memory dependency of a load-based CIDD instruction can be more difficult to check. Thus to avoid the need to determine if a load-based CI instruction has a memory dependency to be replayed, all load-based CI instructions, whether they be CIDD or CIDI instructions, can be classified in a misprediction recovery as CIDD instructions to cause such instructions to be replayed. However, this also replays load-based CIDI instructions that are not memory dependent on the mispredicted instruction control flow path. Thus, in exemplary aspects disclosed herein, only load-based CI instructions that are identified as load-based CIDD instructions are selectively replayed in a misprediction recovery, which can reduce execution delay in the instruction pipeline and power consumption.

In this regard, in exemplary aspects disclosed herein, load-based CI instructions are identified in misprediction recovery as having a store-forward data dependency. A store-forward data dependency is a dependency that exists when a produced store from a store-based instruction is forwarded in an instruction pipeline as a consumed load in a load-based instruction. If a load-based CI instruction is identified as having a store-forward dependency in misprediction recovery, this means the store-based instruction that produces the store data to be consumed by the load-based CI instruction was executed in an instruction stream in an instruction pipeline in the processor before the misprediction recovery, when a mispredicted, incorrect instruction control flow path was taken. Thus, in misprediction recovery, the store-based instruction having a store-forward dependency with the load-based CI instruction may produce a different store result and/or be "removed" from the instruction control flow path as having been a store-based CD instruction in the incorrect taken instruction control flow path. Load-based CI instructions identified as having store-forward dependency in misprediction recovery can be selectively designated as load-based CIDD instructions. Load-based CIDD instructions are replayed (i.e., processed for re-execution) during misprediction recovery to avoid a potentially incorrect load being consumed by the load-based CIDD instruction as a result of the forwarding of a store result from a stored-based instruction to the load-based CI instruction before the misprediction recovery. The replay of load-based CI instructions is limited to replay of load-based CI instructions identified as load-based CIDD instructions. This is opposed to, for example, identifying all load-based CI instructions in misprediction recovery as load-based CIDD instructions for replay without distinguishing between load-based CIDI instructions and load-based CIDD instructions. Only replaying load-based CI instructions identified as having a store-forward dependency in misprediction recovery, as opposed to indiscriminately replaying all load-based CI instructions in misprediction recovery, can reduce execution delay in the instruction pipeline and power consumption in the processor.

In examples disclosed herein, in a misprediction recovery, a store-forward data dependency between a store-based CD instruction and a load-based CI instruction is identified in response to identifying a memory dependence between the load-based CI instruction and a store-based instruction. A store-forward memory dependency can be determined based on a identifying a consumer load-based CI instruction that consumes data at a memory address that overlaps with the memory address at which a producer, store-based instruction stores its produced data.

In one example, a store-forward memory dependency between a load-based CI instruction and a store-based instruction is based on determining if the consumed load data by the load-based CI instruction is an "active" store. An active store is a store operation from processing a store-based instruction that has been forwarded to a consuming load-based instruction in the instruction pipeline, but has not yet been committed to memory. An inactive store is a store operation that is no longer speculative and may have committed (i.e., written back) to memory. Identifying load-based CI instructions based on an active store as a load-based CIDD instructions for replay is based on the recognition that "removed" CD stores are the cause of CIDD instructions being executed with incorrect stored data. "Removed" CD stores are store operations resulting from store-based CD instructions in a predicted instruction control flow path later found to have been mispredicted. In contrast, "added" CD stores are stores resulting from CD store instructions that are "added" as being in a correct instruction data path executed as a result of a misprediction recovery. In misprediction recovery, store-based CD instructions in the mispredicted instruction control flow path are effectively "removed" as a result of loading and executing the correct instruction control flow path. Removed CD stores that were consumed by load-based CI instructions cause functional faults if such load-based CI instructions are not replayed, because otherwise, the previous execution of such load-based CI instructions based on a removed CD store from the mispredicted instruction control flow path will otherwise stand. If a load-based CI instruction was executed based on active stored data, this means the store data consumed by load-based CI instructions could change in misprediction recovery as not yet committed. Thus, load-based CI instructions identified as having a memory dependence on an active store are identified as load-based CIDD instructions for replay. If a load-based CI instruction was executed based on inactive stored data, meaning stored data that was committed to memory, the processor need not identify such load-based CI instruction as a load-based CIDD instruction for replay. This is because stored data is only committed if the predicate of the predicted condition has been resolved as true. If stored data consumed by a load-based CI instruction has been committed, this means a store-based CD instruction in the correct instruction control flow path has replaced the previously stored data by the store-based CD instruction in the incorrect instruction control flow path. Thus, a load-based CI instruction that was not executed based on an active store is identified as a load-based CIDI instruction and is not replayed.

Replaying a load-based CI instruction identified as a load-based CIDD instruction can also resolve "replayed" CIDD stores. A replayed CIDD store is a store-based CIDD instruction that produces data to be consumed by a CI instruction, and thus there is a store-forward data dependence between the store-based CIDD instruction and the consuming CI instruction. Replayed CIDD stores that were consumed by load-based CI instructions cause functional faults if such load-based CI instructions are not replayed, because otherwise, the previous execution of such load-based CI instructions was based on a CIDD store from a mispredicted instruction control flow path. Thus, load-based CI instructions identified as having a memory dependence on an active store being identified as load-based CIDD instructions for replay also resolves data inaccuracies are a result of replayed CIDD stores.

Added CD stores can be handled in their execution in misprediction recovery by determining if younger loads may have overlapping memory addresses. If so, such load instructions are deemed faulty, and the instruction pipeline(s) can be recovered by flushing the instruction pipeline back to the faulty load instruction, and restarting program execution from faulty load instruction. However, in certain exemplary aspects disclosed herein, to lower the flush instances due to added CD stores, a determined active store memory dependence of a load-based CIDI instruction in misprediction recovery can be marked as a load-based CIDD instruction to be replayed. An active store memory dependence of a load-based CIDI instruction typically informs about the historic nature of the load-based CIDI instruction's susceptibility to be forwarded by a store-based instruction that has not yet been executed.

In this regard, in one exemplary aspect, a processor is provided. The processor comprises an instruction processing circuit comprising one or more instruction pipelines. The instruction processing circuit is configured to fetch a plurality of instructions from a memory into an instruction pipeline among the one or more instruction pipelines, the plurality of fetched instructions in the one or more instruction pipelines comprising an instruction stream comprising at least one control independent (CI) instruction region and a plurality of control dependent (CD) instruction regions. The instruction processing circuit is also configured to speculatively predict a predicate in a conditional control instruction in the instruction stream. The instruction processing circuit is also configured to process fetched instructions in the instruction stream comprising fetched instructions in a first CD instruction region among the plurality of CD instruction regions in the instruction stream taken based on the speculative prediction and a load-based CI instruction in a CI instruction region. The instruction processing circuit is also configured to determine if the load-based CI instruction is a store-forward dependent (SFD) load-based CI instruction based on determining if a store-based instruction in the instruction stream designates a forward store for consumption by the load-based CI instruction. The instruction processing circuit is also configured to execute the conditional control instruction to resolve the predicate of the conditional control instruction. The instruction processing circuit is also configured to determine if the speculative prediction matches the resolved predicate from execution of the conditional control instruction. In response to the speculative prediction not matching the resolved predicate in execution of the conditional control instruction, the instruction processing circuit is also configured to process the fetched instructions in a second CD instruction region among the plurality of CD instruction regions in the instruction stream taken based on the resolved predicate from execution of the conditional control instruction and the load-based CI instruction. In response to determining the load-based CI instruction is a SFD load-based CI instruction, the instruction processing circuit is configured to replay the processed load-based CI instruction.

In another exemplary aspect, a method of designating load-based control independent (CI) instructions in an instruction stream in a processor as load-based CI, data dependent (DD) (CIDD) instructions for replay in misprediction recovery is provided. The method comprises fetching a plurality of instructions from a memory into an instruction pipeline among the one or more instruction pipelines, the plurality of fetched instructions in the one or more instruction pipelines comprising an instruction stream comprising at least one control independent (CI) instruction region and a plurality of control dependent (CD) instruction regions. The method also comprises speculatively predicting a predicate in a conditional control instruction in the instruction stream. The method also comprises processing fetched instructions in the instruction stream comprising fetched instructions in a first CD instruction region among the plurality of CD instruction regions in the instruction stream taken based on the speculative prediction and a load-based CI instruction in a CI instruction region. The method also comprises determining if the load-based CI instruction is a SFD load-based CI instruction based on determining if a store-based instruction in the instruction stream designates a forward store for consumption by the load-based CI instruction. The method also comprises executing the conditional control instruction to resolve the predicate of the conditional control instruction. The method also comprises determining if the speculative prediction matches the resolved predicate from execution of the conditional control instruction. In response to the speculative prediction not matching the resolved predicate in execution of the conditional control instruction, the method also comprises processing the fetched instructions in a second CD instruction region among the plurality of CD instruction regions in the instruction stream taken based on the resolved predicate from execution of the conditional control instruction and the load-based CI instruction, and replay the processed load-based CI instruction in response to determining the load-based CI instruction is a SFD load-based CI instruction.

In another exemplary aspect, a processor is provided. The processor comprises an instruction processing circuit comprising one or more instruction pipelines. The instruction processing circuit is configured to fetch a plurality of instructions from a memory into an instruction pipeline among the one or more instruction pipelines, the plurality of fetched instructions in the one or more instruction pipelines comprising an instruction stream comprising at least one control independent (CI) instruction region and a plurality of control dependent (CD) instruction regions. The instruction processing circuit is also configured to speculatively predict a predicate in a conditional control instruction in the instruction stream. The instruction processing circuit is also configured to process fetched instructions in the instruction stream comprising fetched instructions in a first CD instruction region among the plurality of CD instruction regions in the instruction stream taken based on the speculative prediction and a load-based CI instruction in a CI instruction region. The instruction processing circuit is also configured to determine if the load-based CI instruction is predicted to have a memory dependence on a store-based instruction in the instruction stream. The instruction processing circuit is also configured to execute the conditional control instruction to resolve the predicate of the conditional control instruction. The instruction processing circuit is also configured to determine if the speculative prediction matches the resolved predicate from execution of the conditional control instruction. In response to the speculative prediction not matching the resolved predicate in execution of the conditional control instruction, the instruction processing circuit is also configured to process the fetched instructions in a second CD instruction region among the plurality of CD instruction regions in the instruction stream taken based on the resolved predicate from execution of the conditional control instruction and the load-based CI instruction, determine if the load-based CI instruction had the predicted memory dependence as a store-forward dependent (SFD) load-based CI instruction, and in response to determining the load-based CI instruction had the predicted memory dependence as a SFD load-based CI instruction, replay the executed load-based CI instruction as a load-based CI, data dependent (DD) (CIDD) instruction.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is an instruction stream in flowchart form illustrating a conditional branch instruction and control dependent (CD) instructions that are executed dependent on the instruction control flow path taken from a prediction or resolution of the predicate of the conditional branch instruction, and control independent (CI) instructions that are executed irrespective of the instruction control flow path taken from the conditional branch instruction;

Figures 3A, 3B:
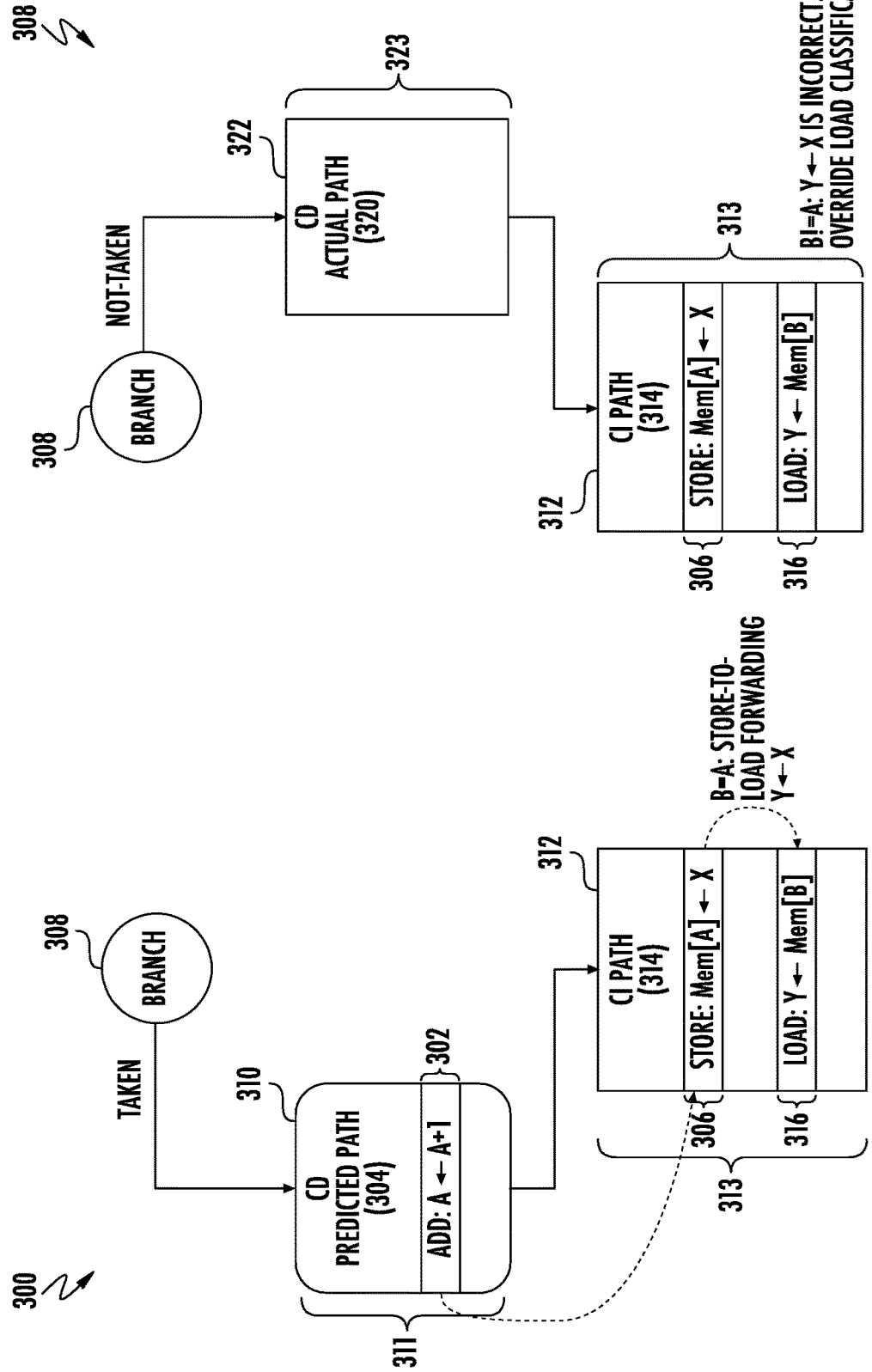
FIG. 3A is an instruction stream in flowchart form illustrating a CI, data dependent (CIDD) store from a store-based CI instruction having a memory dependence on a CD store from a store-based CD instruction in an incorrect, predicted instruction control flow path taken, wherein the CIDD store is forwarded to a CI load in a load-based CI instruction.
Figure 4B:
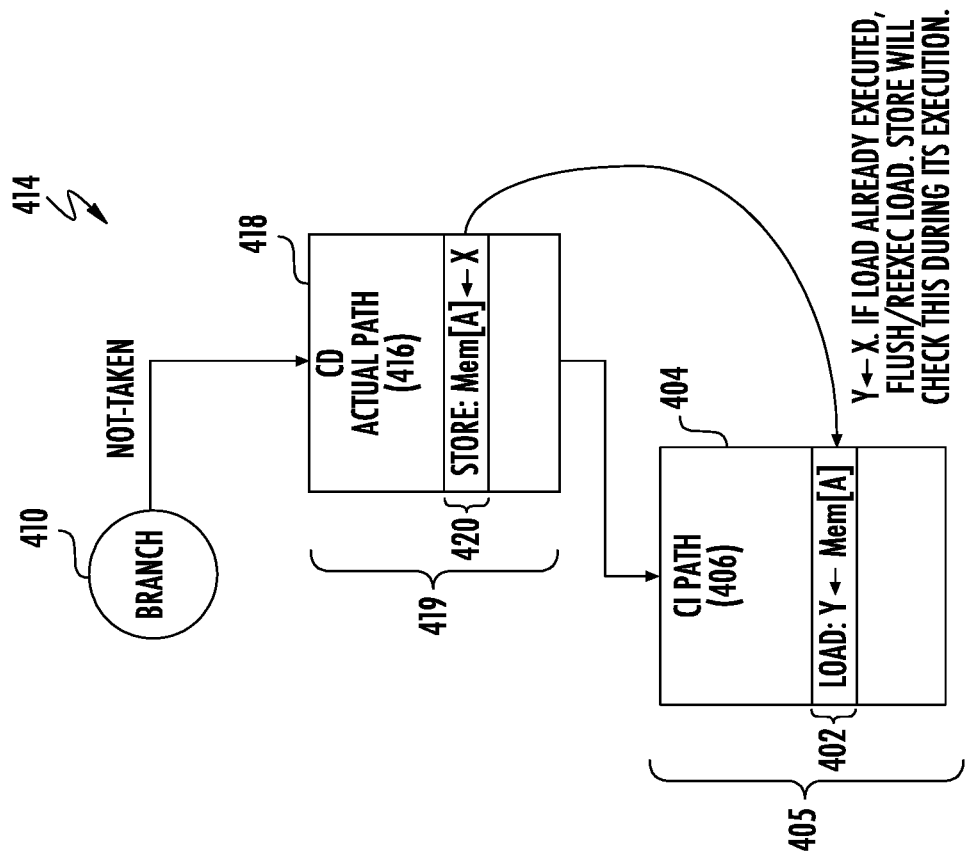
Figure 4A:
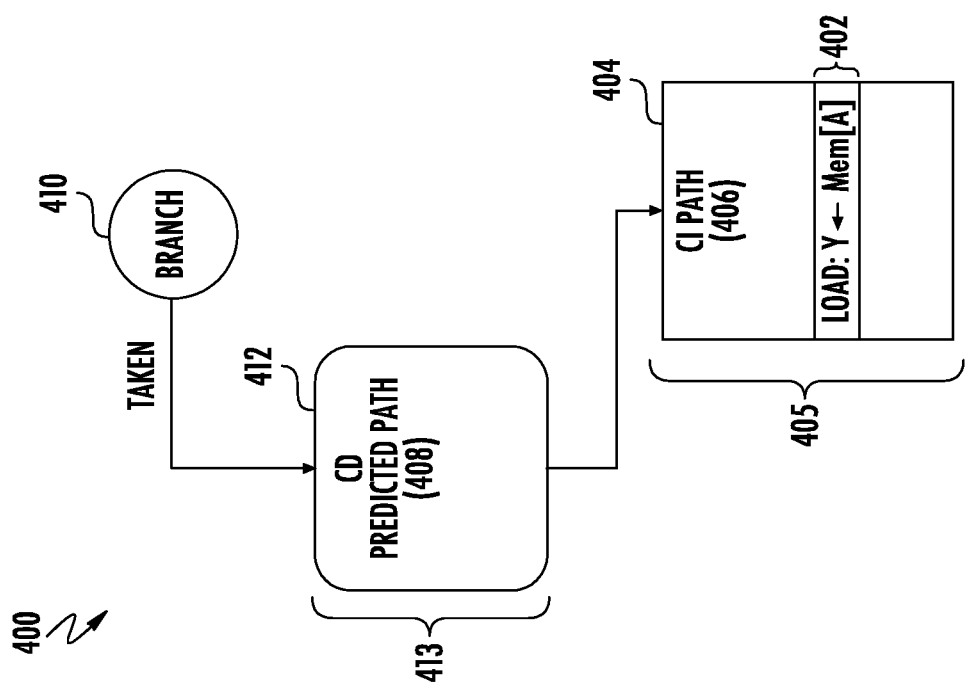
Figure 5B:
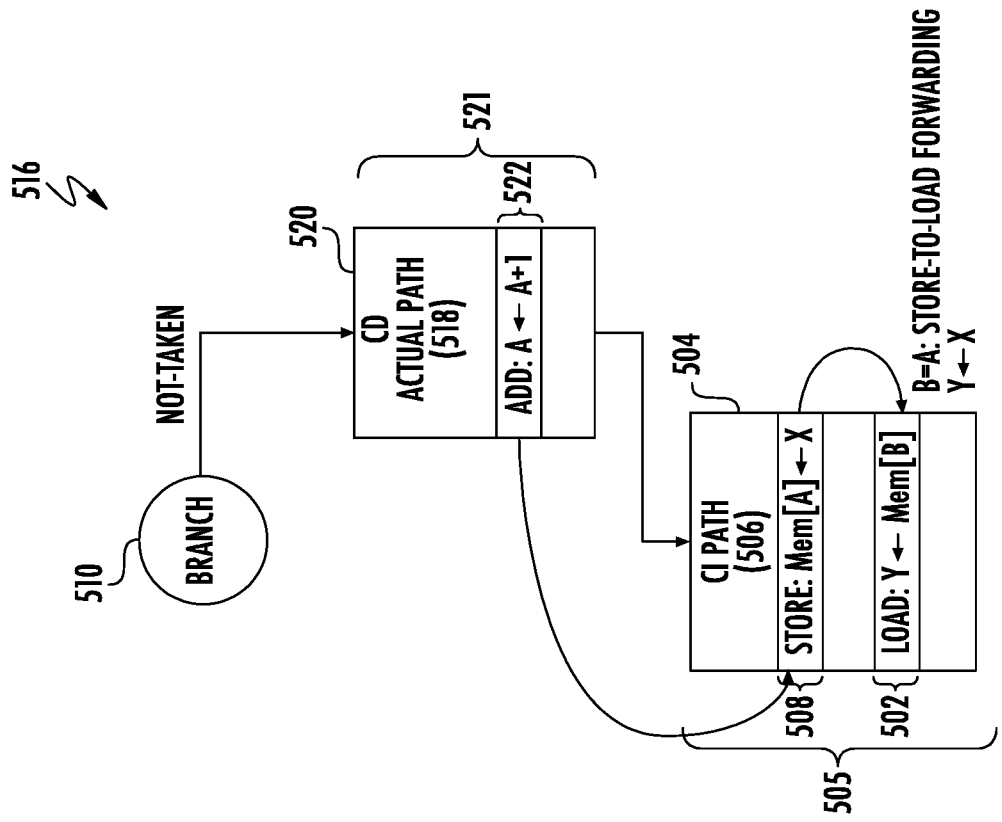
Figure 5A:
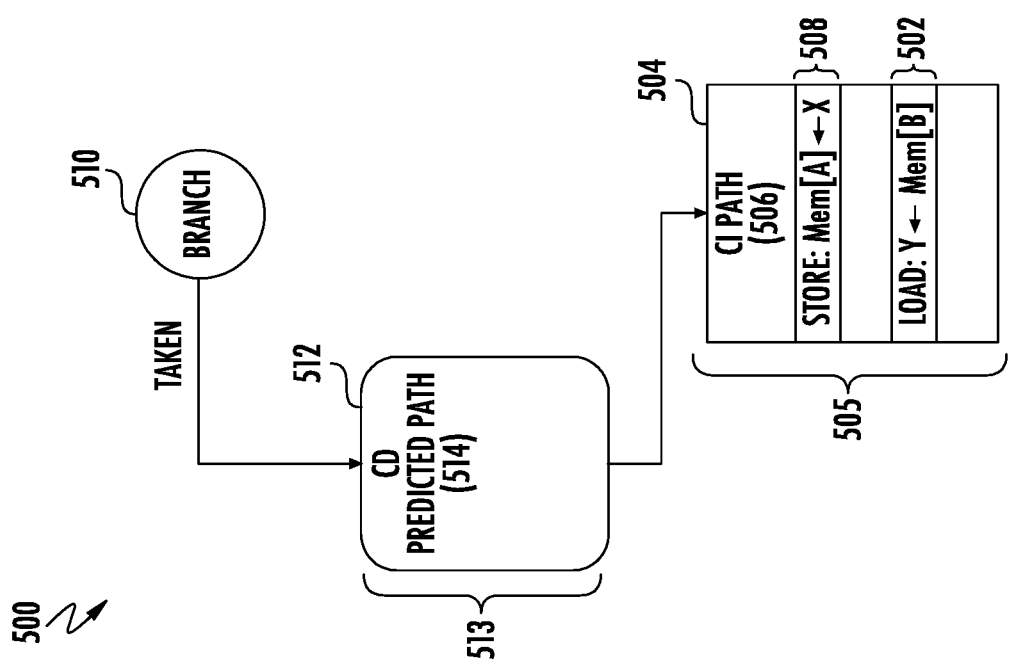
Figure 7:
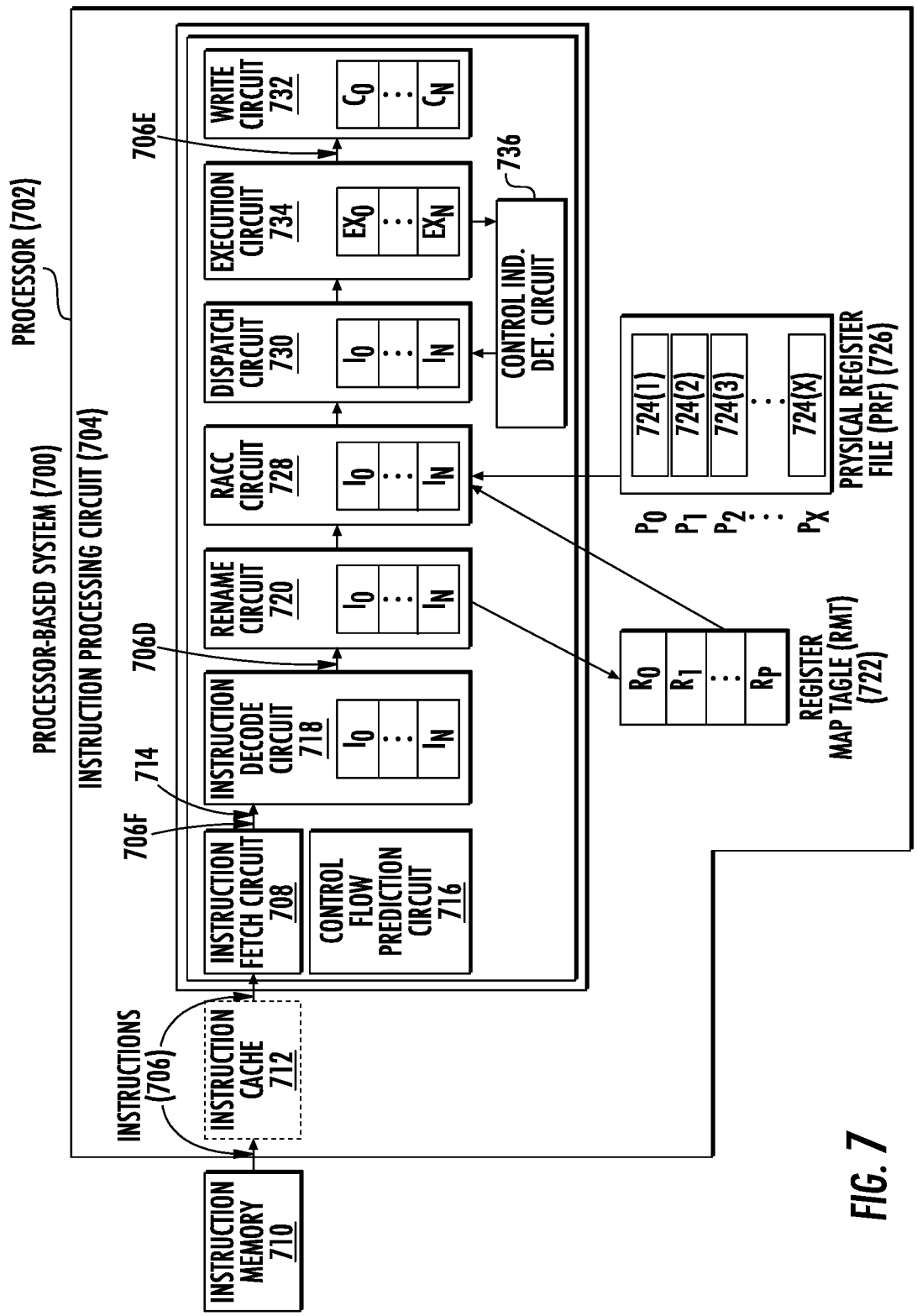
Figure 8:
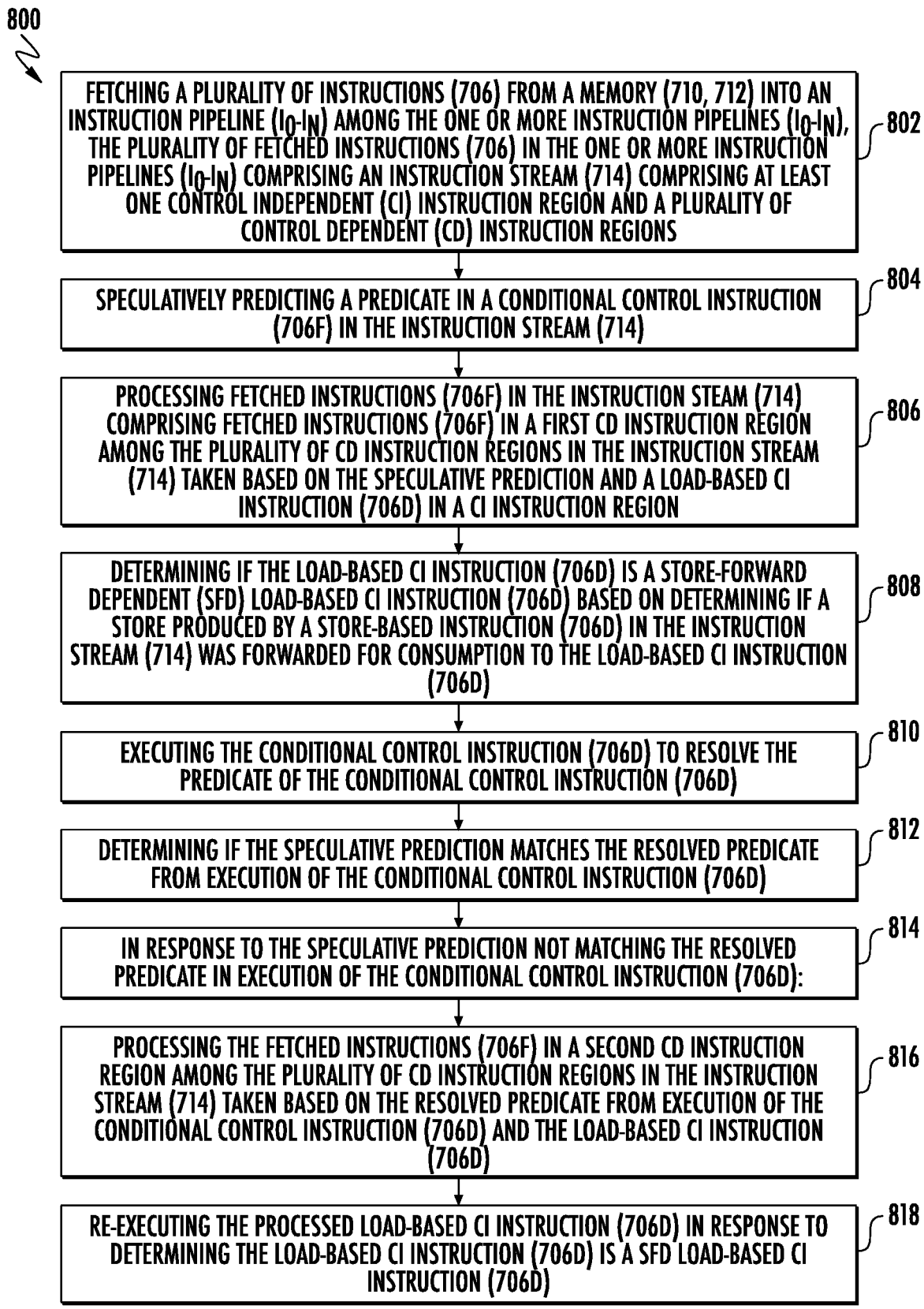
Figure 9:
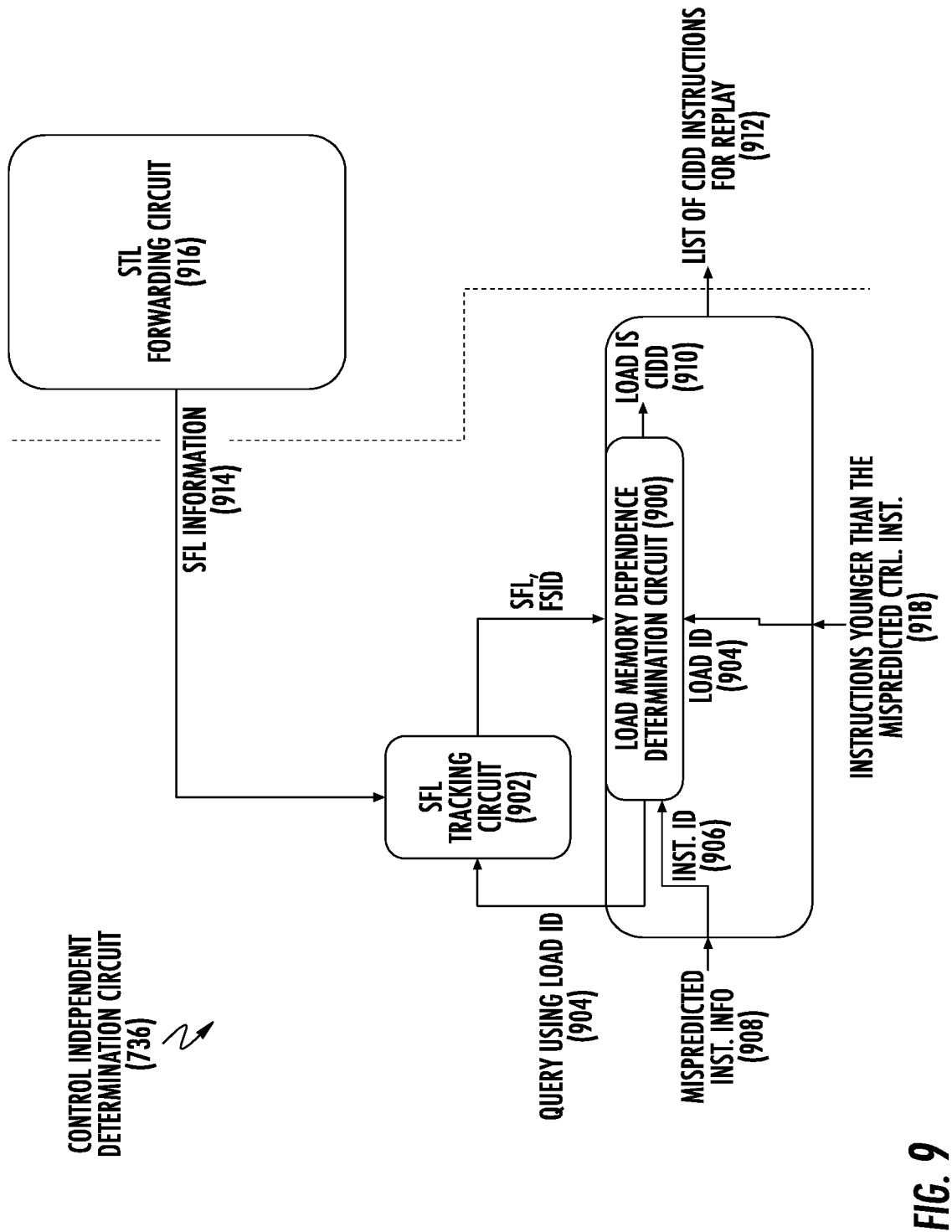
Figure 11B:
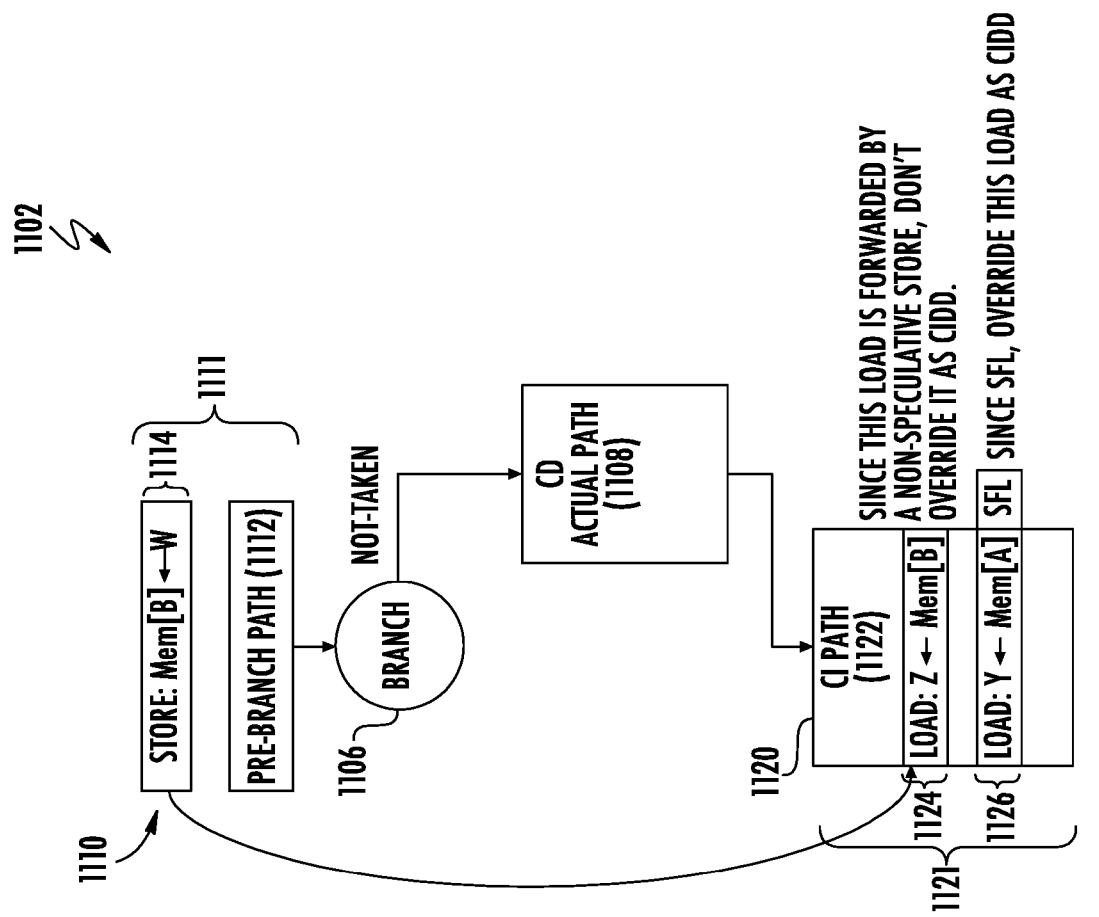
Figure 11A:
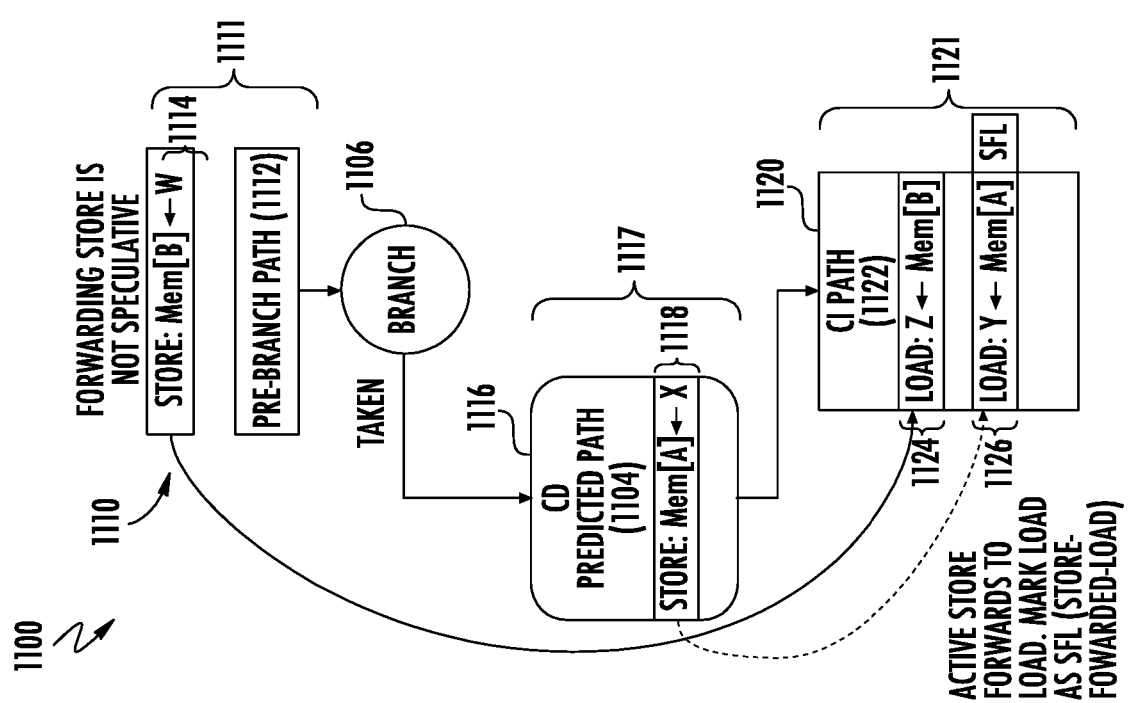
Figures 12A, 12B:
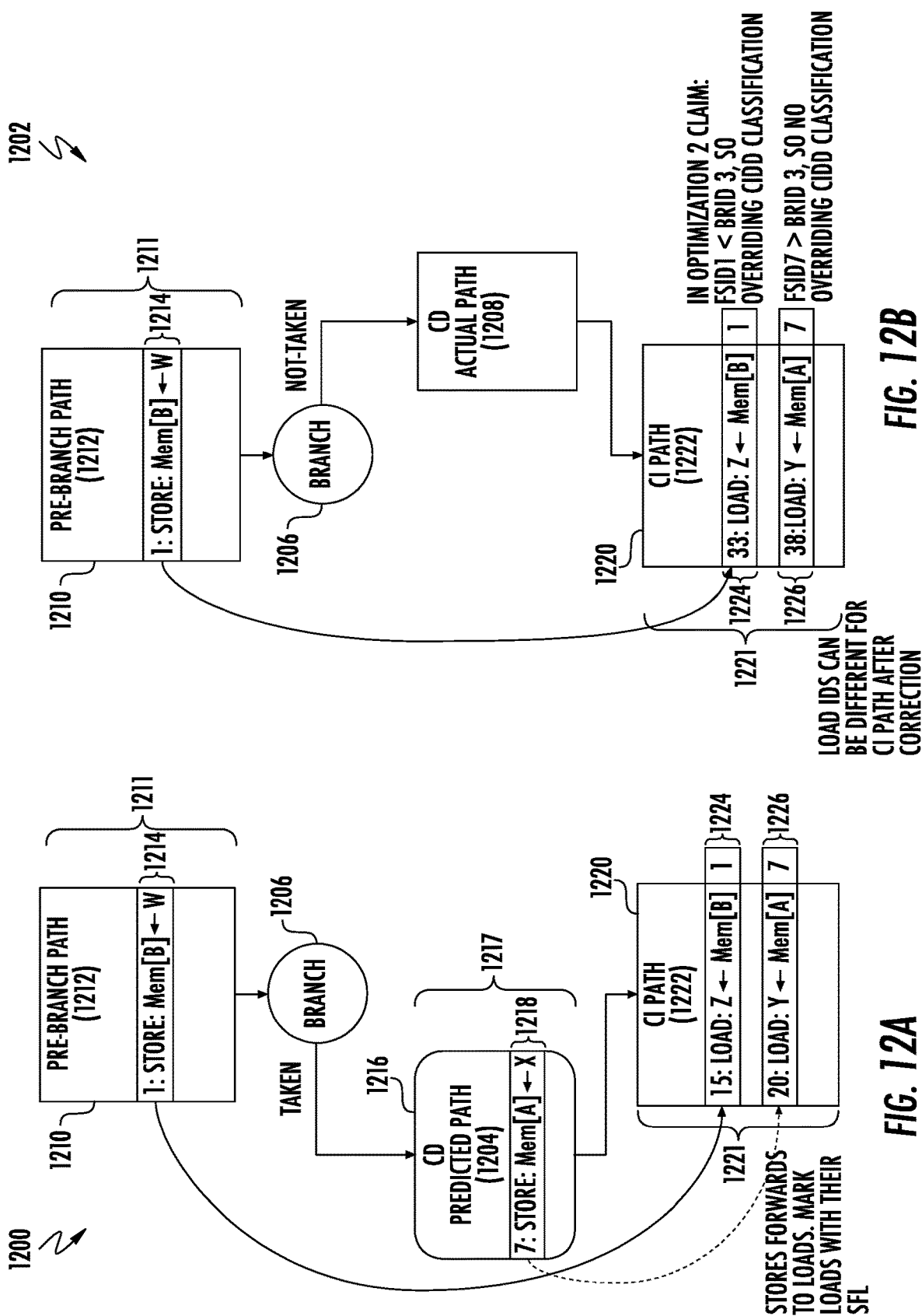
Figure 14:
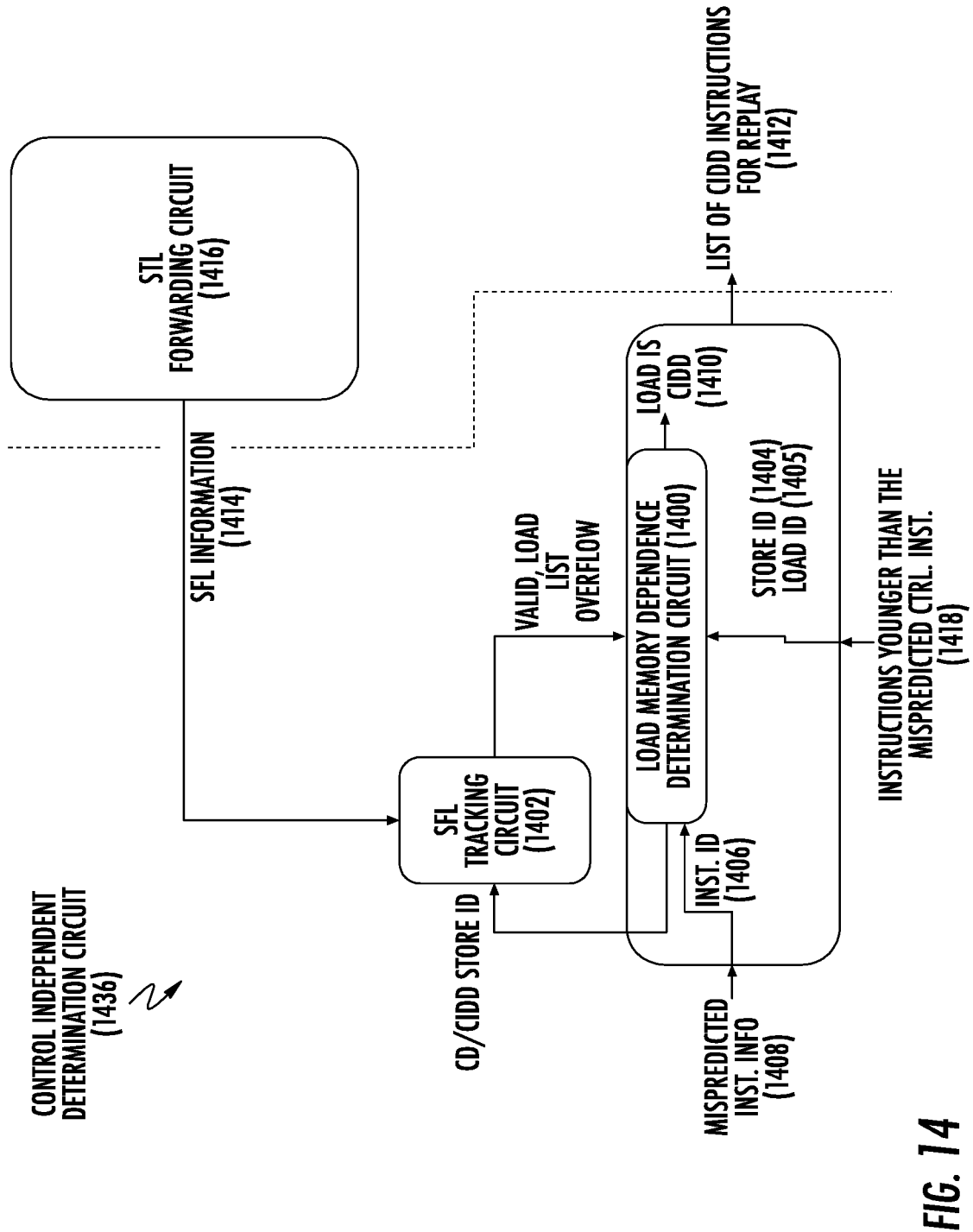
Figure 16:
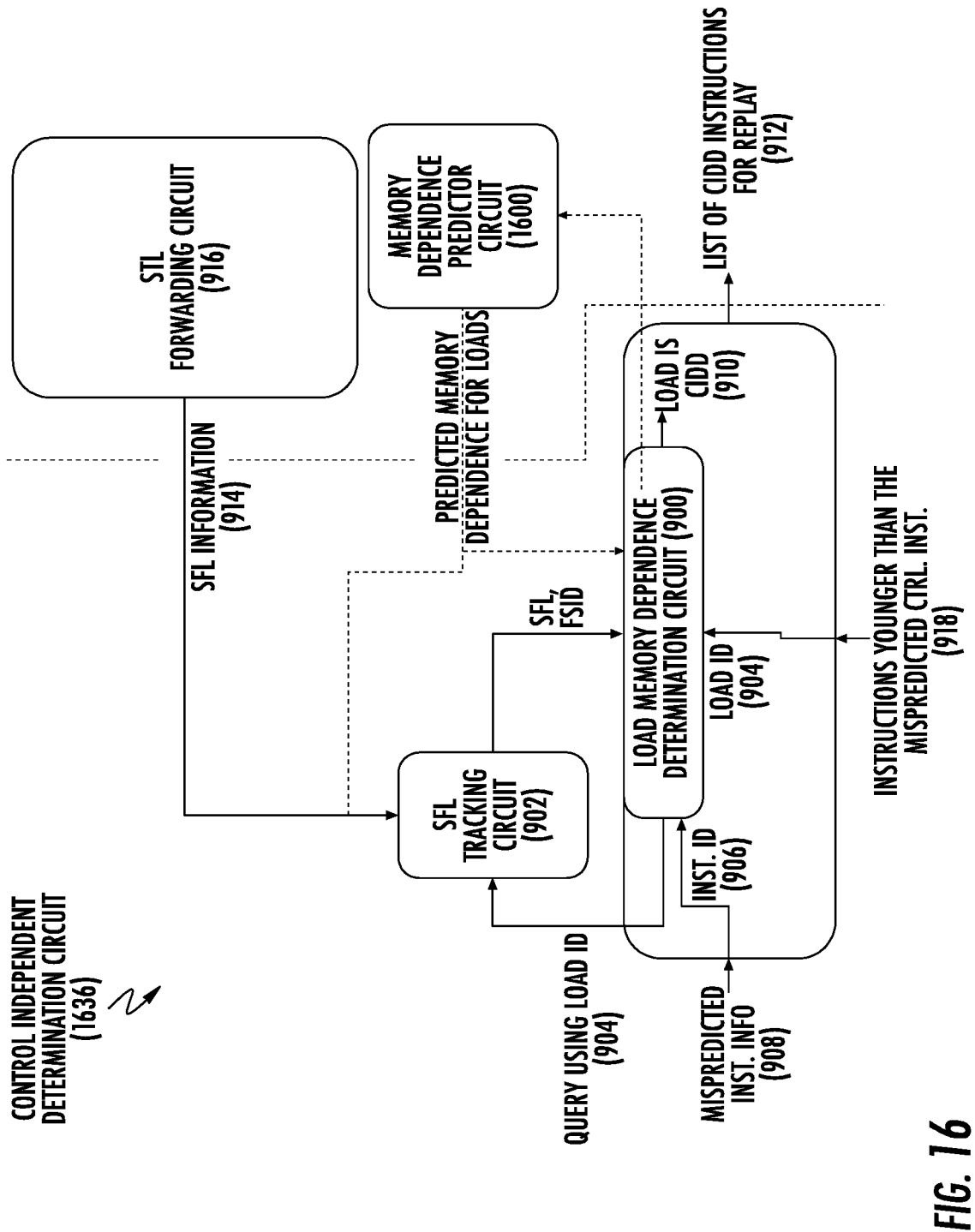
Figure 17B:
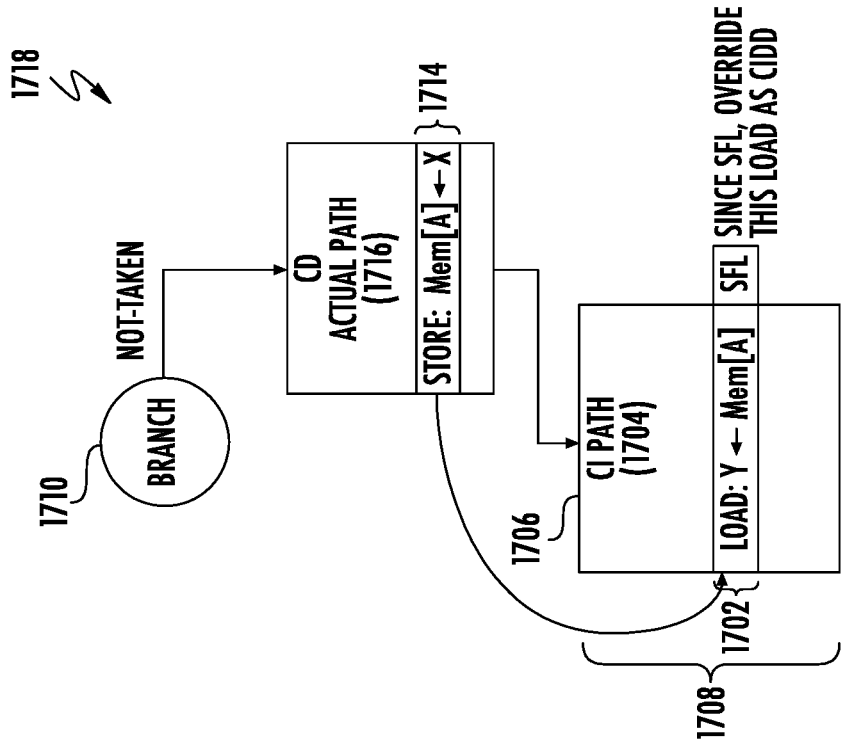
Figure 17A:
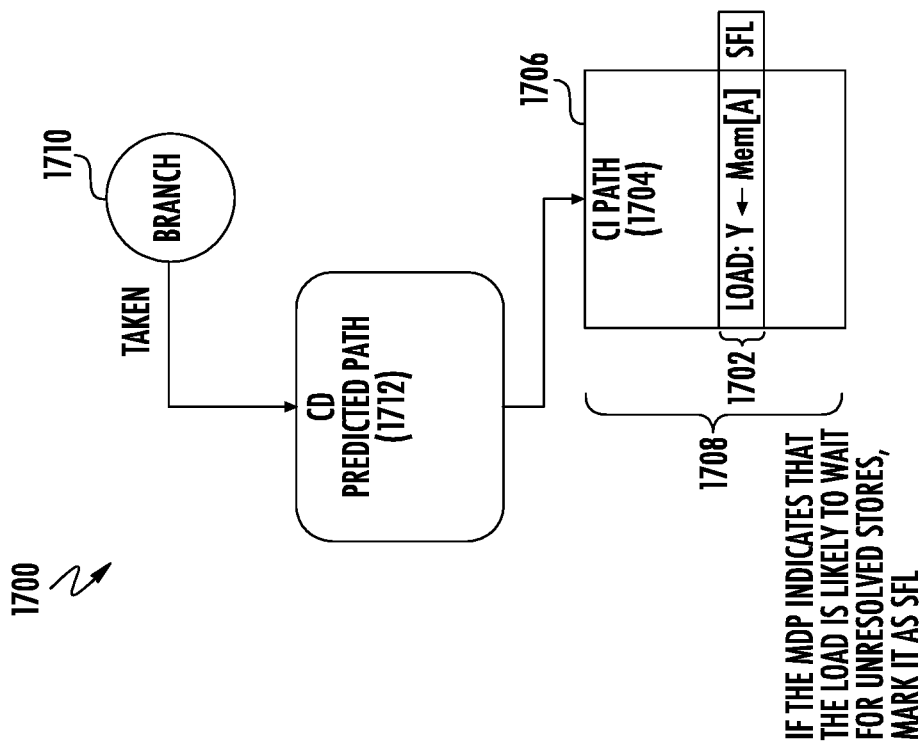
Figure 18:
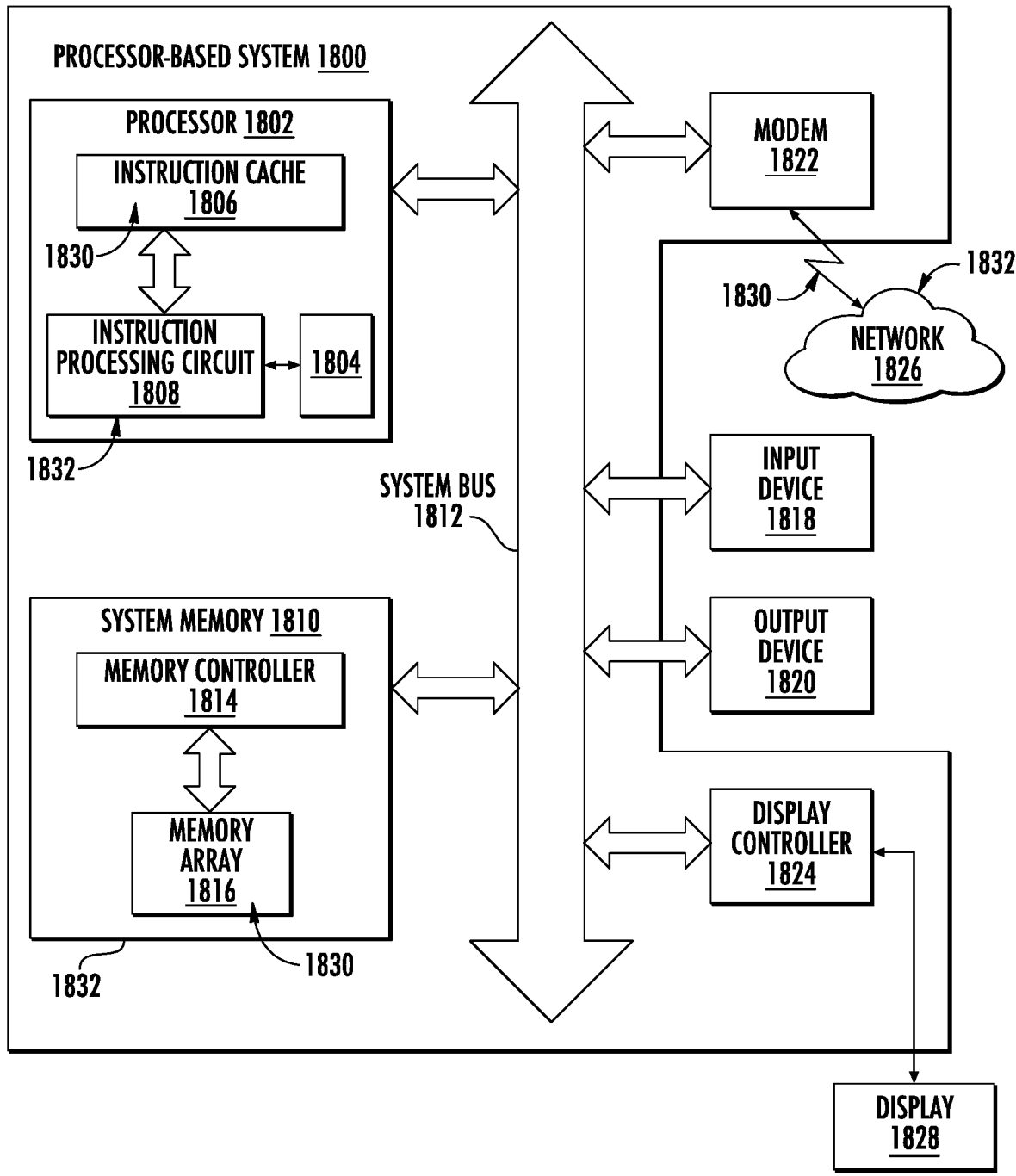

FIG. 3B is an instruction stream in flowchart form processed in misprediction recovery illustrating removal of the CD store from the incorrectly predicted instruction control flow path in FIG. 3A, resulting in an illegal CIDD store in the store-based CI instruction in FIG. 3A based on the incorrect predicted instruction control flow path taken, thus resulting in an illegal CI load in the load-based CI instruction in FIG. 3A;

FIG. 4A is an instruction stream in flowchart form illustrating an incorrect, predicted instruction control flow path taken and a CI, data independent (CIDI) store in a load-based CI instruction;

FIG. 4B is an instruction stream in flowchart form processed in misprediction recovery illustrating an added CD store in a store-based CD instruction in the correct instruction control flow path having memory dependency with the load-based CI instruction in FIG. 4A as a load-based CIDD instruction, resulting in an illegal CI load if the load-based CIDD instruction has already been executed;

FIG. 5A is an instruction stream in flowchart form illustrating an incorrect, predicted instruction control flow path taken, a store-based CI instruction, and a load-based CI instruction that is not memory dependent on the store-based CI instruction based on the incorrect, predicted instruction control flow path being taken;

FIG. 5B is an instruction stream in flowchart form processed in misprediction recovery illustrating an added CD store from a store-based CD instruction in a correct instruction control flow path taken that has a memory dependency with the store-based CI instruction in FIG. 5B, wherein the load-based CI instruction in FIG. 5B has a memory dependency with the store-based CI instruction as a result of the CD store from the store-based CD instruction;

FIG. 6A is an instruction stream in flowchart form that illustrates tracking of store-forward memory dependencies between stores and CI loads in load-based CI instructions in a CI instruction stream following a predicted, incorrect CD instruction control flow path taken from a conditional control instruction, wherein the CI loads are forwarded from a CD store in a store-based CD instruction and a CI store in a store-based CI instruction;

FIG. 6B is an instruction stream in flowchart form that illustrates the designation of the load-based CI instructions in the CI instruction stream in FIG. 6A in misprediction recovery for replay, based on the CI loads of the load-based CI instruction being designated as CIDD loads;

FIG. 7 is a schematic diagram of an exemplary processor-based system that includes a processor with one or more instruction pipelines for processing computer instructions for execution, wherein the processor includes a control independent determination circuit communicatively coupled to the instruction pipeline and configured to track store-forward dependencies for CI loads in load-based CI instructions and selectively designate store-forward dependent load-based CI instructions in the CI instruction stream in FIG. 6A in misprediction recovery for replay;

FIG. 8 is a flowchart illustrating an exemplary process of a processor, such as the processor in FIG. 7, tracking store-forward dependencies for CI loads in load-based CI instructions and selectively designating determined store-forward dependent load-based CI instructions in the CI instruction stream in misprediction recovery as load-based CIDD instructions for replay;

FIG. 9 is a schematic diagram illustrating exemplary details of a control independent determination circuit that can be provided in the processor in FIG. 7 to track store-forward dependencies for CI loads in load-based CI instructions and selectively designate store-forward dependent load-based CI instructions in the CI instruction stream in FIG. 6A in misprediction recovery as load-based CIDD instructions for replay;

FIG. 10 is an exemplary store-forward tracking memory controlled by an exemplary store-forward tracking circuit in the control independent determination circuit in FIG. 9, wherein the store-forward tracking memory is configured to store load instruction entries by a load identification (ID), and for each load ID, an identification of whether the consumed load for the load instruction was forwarded by a produced store from a store instruction and the ID of any such store instruction;

FIG. 11A is an instruction stream in flowchart form that illustrates the control independent determination circuit in FIG. 9 tracking store-forward dependencies based on a forwarded CD store from a store-based instruction to a load-based CI instruction in a CI instruction stream being an active store to be replayed in misprediction recovery;

FIG. 11B is an instruction stream in flowchart form to illustrate the control independent determination circuit in FIG. 9 designating a load-based CI instruction in FIG. 11A having a SFD on an active store as a load-based CIDD instruction for replay;

FIG. 12A is an instruction stream in flowchart form that illustrates the control independent determination circuit in FIG. 9 tracking store instruction IDs of store-based instructions that produce stores forwarded for CI loads of load-based CI instructions in a CI instruction stream following a predicted, incorrect CD instruction control flow path taken from a conditional control instruction;

FIG. 12B is an instruction stream in flowchart form to illustrate the control independent determination circuit in FIG. 9 designating the load-based CI instruction in FIG. 12A as a load-based CIDD instruction for replay if its forwarding store instruction ID indicates the corresponding store-based instruction is not older than the conditional control instruction;

FIG. 13A is an instruction stream in flowchart form that illustrates the control independent determination circuit in FIG. 9 tracking store instruction IDs of store-based instructions that produce stores forwarded for CI loads of load-based CI instructions in a CI instruction stream following a predicted, incorrect CD instruction control flow path taken from a conditional control instruction;

FIG. 13B is an instruction stream in flowchart form to illustrate the control independent determination circuit in FIG. 9 designating the load-based CI instruction in FIG. 13A as a load-based CIDD instruction for replay if its forwarding store instruction ID is not older than the most recent non-speculative store-based instruction;

FIG. 14 is a schematic diagram illustrating exemplary details of an alternative control independent determination circuit that can be provided in the processor in FIG. 7 to track store-forward dependencies for CI loads in load-based CI instructions and selectively designate store-forward dependent load-based CI instructions in the CI instruction stream in misprediction recovery as load-based CIDD instructions for replay;

FIG. 15 is an exemplary store-forward tracking memory controlled by an exemplary store-forward tracking circuit in the control independent determination circuit in FIG. 14, wherein the store-forward tracking memory is configured to store load instruction entries by a load ID, and for each load ID, an identification of whether the consumed load for the load instruction was forwarded by a produced store from a store instruction and the ID of any such store instruction;

FIG. 16 is a schematic diagram illustrating exemplary details of an alternative control independent determination circuit that can be provided in the processor in FIG. 7 to track CI loads in load-based CI instructions having a predicted store-forward dependence and selectively designating predicted store-forward dependent load-based CI instructions in the CI instruction stream in misprediction recovery as load-based CIDD instructions for replay;

FIG. 17A is an instruction stream in flowchart form that illustrates the control independent determination circuit in FIG. 16 capturing a memory dependence prediction for a load-based CI instruction in a CI instruction stream following a predicted, incorrect CD instruction control flow path taken from a conditional control instruction and marking the load-based CI instruction as store-forward dependent in response to the memory dependence prediction indicating a dependence prediction;

FIG. 17B is an instruction stream in flowchart form to illustrate a control independent determination circuit in FIG. 16 configured to determine if the load-based CI instruction in FIG. 17A is marked as having a store-forward dependence and marking the load-based CI instruction as a load-based CIDD instruction for replay in response to the load-based CI instruction being marked as having a store-forward dependence; and FIG. 18 is a block diagram of an exemplary processor-based system that includes a processor with one or more instruction pipelines for processing computer instructions for execution and a control independent determination circuit, wherein the processor includes the control independent determination circuit communicatively coupled to the instruction pipeline and configured to track store-forward dependencies for CI loads in load-based CI instructions and selectively designate store-forward dependent load-based CI instructions in the CI instruction stream in misprediction recovery as load-based CIDD instructions for replay, wherein the processor can include, without limitation, the processor in FIG. 7 and the control independent determination circuit can include, without limitation, the control independent determination circuits in FIGS. 9, 14, and 16.

DETAILED DESCRIPTION

Exemplary aspects disclosed herein include limiting replay of load-based control independent (CI) instructions in speculative misprediction recovery in a processor, and related methods. The processor is configured to speculatively predict the outcome of a condition (i.e., predicate) of conditional control instructions (e.g., conditional branch, conditional call, conditional return, branch table instructions) to pre-fetch instructions in a predicted instruction control flow path into an instruction pipeline to be processed to reduce instruction fetch delay. In exemplary aspects, in a misprediction recovery, a processor is configured to identify load-based CI instructions in an instruction pipeline having a store-forward data dependency between a store-based control dependent (CD) instruction and the load-based CI instruction as CI, data dependent (CIDD) instructions. CIDD instructions are replayed in misprediction recovery since these instructions were executed based on consuming stored data from a store-based CD instruction in the incorrect instruction control flow path, and thus the consumed stored data may have been inaccurate. CD instructions are instructions that get executed dependent on the instruction control flow path taken based on the resolution of a predicate in the conditional control instruction. CI instructions are instructions that get executed regardless of the instruction control flow path taken as a result of a conditional control instruction. CI instructions that do not consume data based on data produced from a CD instruction are CI, data independent (CIDI) instructions. CI instructions that consume data based on data dependence from a CD instruction are CIDD instructions. A CIDD instruction can have a register dependency where the dependency between instructions is known via the producer and consumer of a register. A load-based CIDD instruction can have a memory dependency where the dependency between instructions is based on a producer producing a result to a memory location that is consumed by a consumer. While register dependency of a CIDD instruction can more easily be checked during instruction processing, a memory dependency of a load-based CIDD instruction can be more difficult to check. Thus to avoid the need to determine if a load-based CI instruction has a memory dependency to be replayed, all load-based CI instructions, whether they be CIDD or CIDI instructions, can be classified in a misprediction recovery as CIDD instructions to cause such instructions to be replayed. However, this also replays load-based CIDI instructions that are not memory dependent on the mispredicted instruction control flow path. Thus, in exemplary aspects disclosed herein, only load-based CI instructions that are identified as load-based CIDD instructions are selectively replayed in a misprediction recovery, which can reduce execution delay in the instruction pipeline and power consumption.

In this regard, in exemplary aspects disclosed herein, load-based CI instructions are identified in misprediction recovery as having a store-forward data dependency. A store-forward data dependency is a dependency that exists when a produced store from a store-based instruction is forwarded in an instruction pipeline as a consumed load in a load-based instruction. If a load-based CI instruction is identified as having a store-forward dependency in misprediction recovery, this means the store-based instruction that produces the store data to be consumed by the load-based CI instruction was executed in an instruction stream in an instruction pipeline in the processor before the misprediction recovery, when a mispredicted, incorrect instruction control flow path was taken. Thus, in misprediction recovery, the store-based instruction having a store-forward dependency with the load-based CI instruction may produce a different store result and/or be "removed" from the instruction control flow path as having been a store-based CD instruction in the incorrect taken instruction control flow path. Load-based CI instructions identified as having store-forward dependency in misprediction recovery can be selectively designated as load-based CIDD instructions. Load-based CIDD instructions are replayed (i.e., processed for re-execution) during misprediction recovery to avoid a potentially incorrect load being consumed by the load-based CIDD instruction as a result of the forwarding of a store result from a stored-based instruction to the load-based CI instruction before the misprediction recovery. The replay of load-based CI instructions is limited to replay of load-based CI instructions identified as load-based CIDD instructions. This is opposed to, for example, identifying all load-based CI instructions in misprediction recovery as load-based CIDD instructions for replay without distinguishing between load-based CIDI instructions and load-based CIDD instructions. Only replaying load-based CI instructions identified as having a store-forward dependency in misprediction recovery, as opposed to indiscriminately replaying all load-based CI instructions in misprediction recovery, can reduce execution delay in the instruction pipeline and power consumption in the processor.

In examples disclosed herein, in a misprediction recovery, a store-forward data dependency between a store-based CD instruction and a load-based CI instruction is identified in response to identifying a memory dependence between the load-based CI instruction and a store-based instruction. A store-forward memory dependency can be determined based on a identifying a consumer load-based CI instruction that consumes data at a memory address that overlaps with the memory address at which a producer, store-based instruction stores its produced data.

Figure 1:
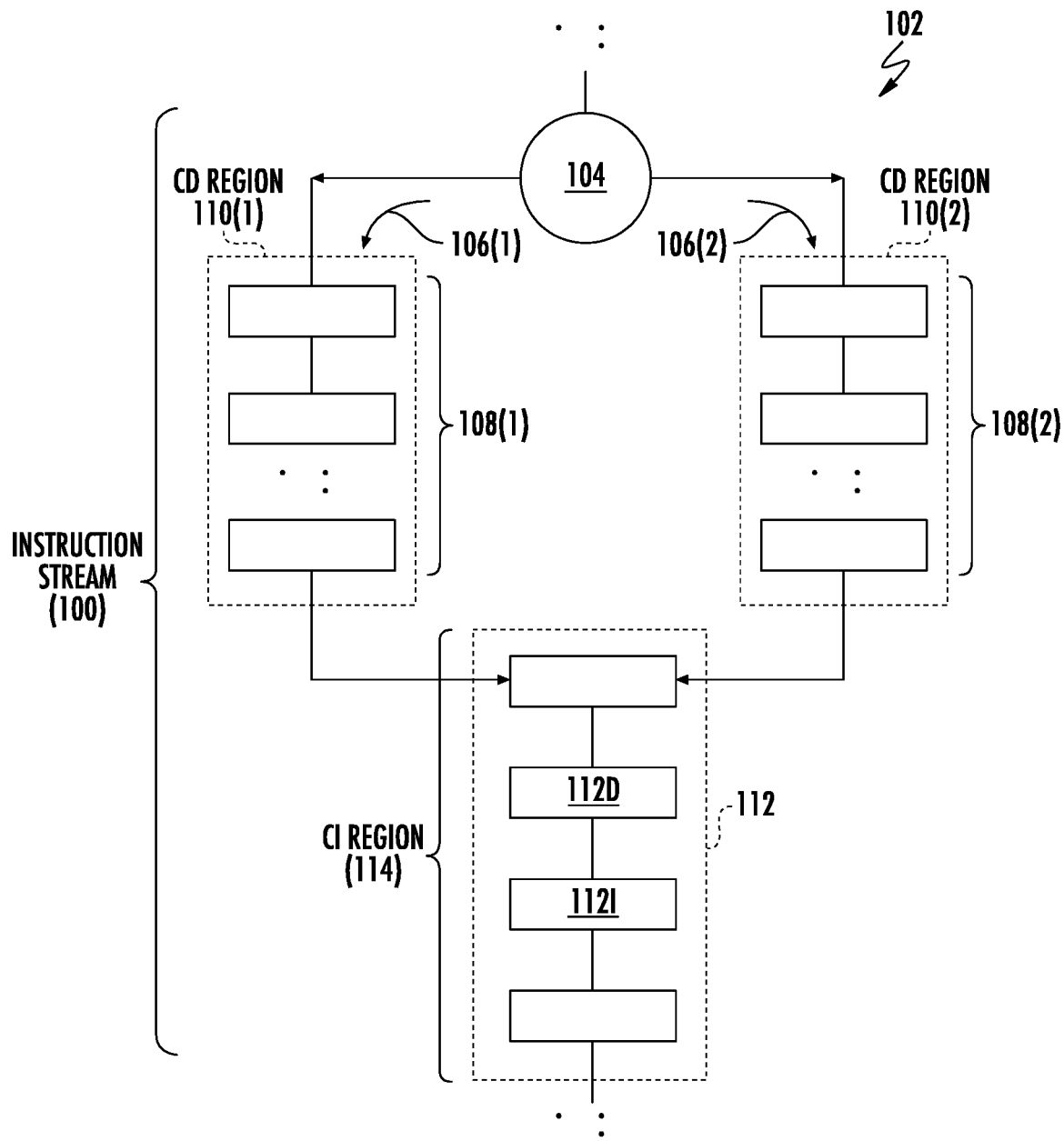
Figure 2B:
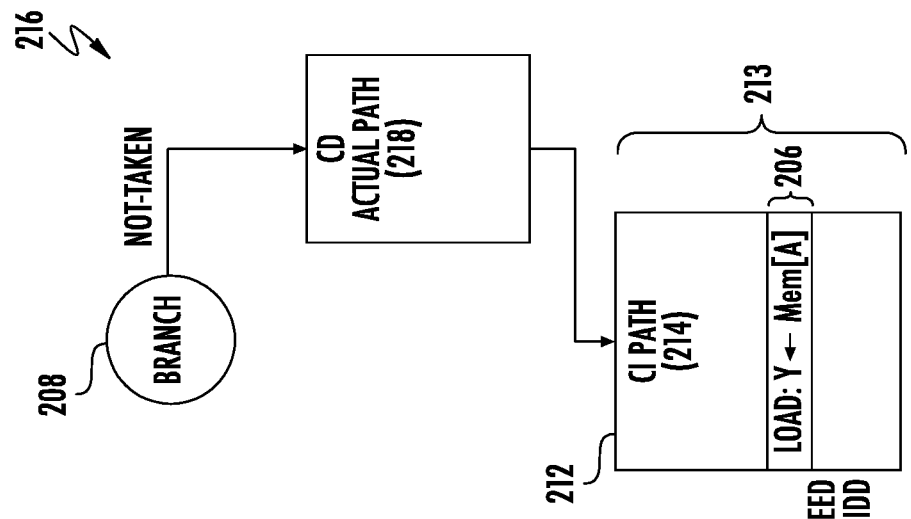
FIG. 2B is an instruction stream in flowchart form processed in misprediction recovery illustrating removal of the CD store from the incorrectly predicted instruction control flow path in FIG. 2A, resulting in an illegal CI load in the load-based CI instruction in FIG. 2A based on the incorrect predicted instruction control flow path taken.
Figure 2A:
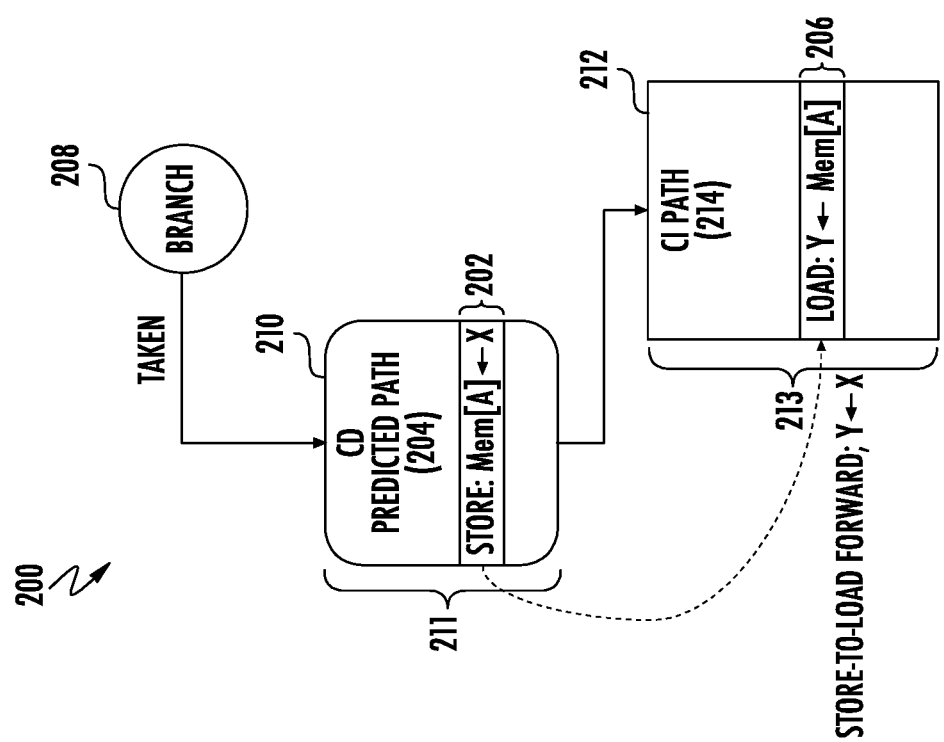
FIG. 2A is an instruction stream in flowchart form illustrating a CD store from a store-based CD instruction resulting from an incorrect predicted instruction control flow path taken, which is forwarded to a memory-dependent CI load in a load-based CI instruction.

To illustrate a store-forward data dependency between a store-based CD instruction and the load-based CI instruction as a CIDD instruction, FIGS. 2A and 2B are provided. FIG. 2A is an instruction stream 200 in flowchart form illustrating a CD store from a store-based CD instruction 202 resulting from an incorrect, predicted instruction control flow path taken ("CD predicted path 204"). An instruction stream 200 is a collection of instructions that are processed in a processor based on an instruction set or listing of computer instructions loaded into the processor. The CD store from the store-based CD instruction 202 is forwarded to a memory-dependent CI load in a load-based CI instruction 206 when the predicted instruction control flow path is taken. Thus, the load-based CI instruction 206 has a store-forward dependency on the store-based CD instruction 202 when the predicted instruction control flow path is taken. A store-forward data dependency or "store-forward dependency" (SFD) is a dependency that exists when a produced store from a store-based instruction is forwarded in an instruction pipeline as a consumed load in a load-based instruction. The instruction stream 200 in FIG. 2A includes a conditional branch instruction 208 that is evaluated by a processor executing instructions in the instruction stream 200. A processor can be configured to predict the outcome of the conditional branch instruction 208 before the condition or predicate of the conditional branch instruction 208 is fully evaluated in an execution of the conditional branch instruction 208 to avoid delays in an instruction pipeline. FIG. 2A illustrates a prediction of the evaluation of the conditional branch instruction 208 resulting in the branch taken. Instructions in the instruction stream 200 that are processed in an instruction control flow path as a result of the branch taken are CD instructions, meaning that the control of their processing is dependent on the prediction of evaluation results of the conditional branch instruction 208. Instructions in the instruction stream 200 that are processed in an instruction control flow path regardless of the branch taken are CI instructions, meaning that the control in their processing is not dependent on the prediction of the evaluation results of the conditional branch instruction 208.

In the example in FIG. 2A, the branch taken path of the instruction stream 200 is the CD predicted path 204 that includes CD instructions 210 in a CD instruction region 211 including the store-based CD instruction 202. The store-based CD instruction 202 is a CD instruction, because its insertion in the instruction stream 200 to be executed by a processor is dependent on the evaluation results of the conditional branch instruction 208. In this example, the store-based CD instruction 202 stores 'X' in memory location [A]. There are instructions in the instruction stream 200 that follow later from the CD instructions 210 in the CD predicted path 204 that are CI instructions 212 in a CI instruction region 213 in a CI instructions flow path 214 ("CI path 214"). The CI instructions 212 include the load-based CI instruction 206 that loads the data at memory location [A] into 'Y'. For example, a processor may be able to recognize the memory dependency between the load-based CI instruction 206 and the store-based CD instruction 202 and forward the store results of 'X' from processing the store-based CD instruction 202 to 'X' as the target of the load-based CI instruction 206 before the store result of store-based CD instruction 202 is committed (i.e., written) to memory location [A]. Since the store-based CD instruction 202 in the CD predicted path 204 calls for the store of 'X' into memory location [A], and the source of the load of the load-based CI instruction 206 is also memory location [A], 'Y' will eventually be 'X' when the store-based CD instruction 202 and load-based CI instruction 206 are executed. Thus, the load-based CI instruction 206 is considered a CIDD instruction being data dependent on the store produced by the store-based CD instruction 202, which is a CD instruction 210.

However, as shown in instruction stream 216 FIG. 2B, if during execution of the conditional branch instruction 208, it is determined that the condition of the conditional branch instruction 208 is actually evaluated to the not taken instruction control flow path 218 as the actual path ("actual path 218"), this means a misprediction occurred earlier when the condition of the conditional branch instruction 208 was predicted to be taken. Instruction stream 216 will then be executed by the processor in a misprediction recovery with the not-taken, actual path 218 being executed. Thus, the instructions in the not-taken, actual path 218 are also CD instructions in that they are control dependent on the outcome of the conditional branch instruction 208. As shown in FIG. 2B, the same load-based CI instruction 206 is present in the CI path 214, because the CI path 214 includes CI instructions 212 that are executed regardless of the outcome conditional branch instruction 208 evaluation. However, in this example, the store-based instruction 202 present in the CD instructions 210 in the CD predicted path 204 in FIG. 2A is not present in the CD instructions in the actual path 218 in FIG. 2B. Thus, the store-based instruction 202 is effectively "removed" in misprediction recovery such that the previously stored 'X' data is still stored memory location [A], but yet would not have been stored but for the CD instructions 210 in incorrect, CD predicted path 204 being previously taken and processed from the instruction stream 200. This results in an illegal forwarding of memory location [A] to the load-based CI instruction 206. While register dependent of a CIDD instruction can more easily be determined during instruction processing to determine if the CIDD instruction should be replayed in a misprediction recovery, it is more difficult to determine if a load-based CIDD instruction has a memory dependency on a CD instruction. Thus to avoid the need to determine if a load-based CI instruction has a memory dependency to be replayed, a processor can be configured to designate all CI instructions 212 as CIDD instructions to be replayed in a misprediction recovery illustrated in the instruction stream 216 in FIG. 2B to avoid this potential illegal load condition.

A store-based CD instruction can also have a data dependency with an intermediate store-based CI instruction that also has a memory dependency with a load-based CI instruction, which also results in an illegal forwarding of data to the load-based CI instruction. In this regard, FIG. 3A is an instruction stream 300 in flowchart form illustrating a CD store from a store-based CD instruction 302 resulting from an incorrect, predicted instruction control flow path taken ("CD predicted path 304"), which is forwarded to a memory-dependent CI store in a store-based CI instruction 306. The instruction stream 300 in FIG. 3A includes a conditional branch instruction 308. The branch taken path of the instruction stream 300 is the CD predicted path 304 that includes CD instructions 310 in a CD instruction region 311 including the store-based CD instruction 302. In this example, the store-based CD instruction 302 stores the result of 'A+1' in memory location [A]. CI instructions 312 in a CI instruction control flow path 314 ("CI path 314") in a CI instruction region 313 include the store-based CI instruction 306 that stores 'X' to memory location [A] dependent on the store operation in store-based CD instruction 302 of 'A=A+1'. Load-based CI instruction 316 loads the data in memory location [B] to 'Y'. Thus, if A=B, this results in a store-to-load forwarding of 'X' to 'Y' which causes a memory dependence to exist between the store-based CD instruction 302 and the load-based CI instruction 316. Thus, the load-based CI instruction 316 in the CI path 314 is a CIDD load-based instruction that is affected by the outcome of the evaluation of the conditional branch instruction 308.

However, as shown in instruction stream 318 in FIG. 3B, if during execution of the conditional branch instruction 308, it is determined that the condition of the conditional branch instruction 208 is actually evaluated to the not taken CD instruction control flow path 320 as the CD actual path ("CD actual path 320"), this means a misprediction occurred earlier when the condition of the conditional branch instruction 308 was predicted to be taken. Instruction stream 318 will then be executed by the processor in a misprediction recovery with the not-taken, CD actual path 320 being executed. As shown in FIG. 3B, the same store-based CI instruction 306 and load-based CI instruction 316 are present in the CI path 314, because the CI path 314 includes the CI instructions 312 that are executed regardless of the outcome conditional branch instruction 308 evaluation. However, in this example, the store-based CD instruction 302 present in the CD instructions 310 in the CD predicted path 304 in FIG. 3A is not present in CD instructions 322 in a CD instruction region 323 in the CD actual path 320 in FIG. 3B. Thus, the store-based CD instruction 302 is effectively "removed" in misprediction recovery such that the produced store data of 'A+1' is still stored in 'A', but yet would not have been stored but for the CD instructions 310 in incorrect, CD predicted path 304 being previously taken and processed from the instruction stream 300. This results in 'X' in load-based CI instruction 316 in misprediction recovery being stored at memory location 'A' causing B=A when 'B' should not be equal to 'A', thus causing 'X' to be loaded into 'Y' illegally as a result of execution of the load-based CI instruction 316. Thus, a processor can be configured to designate all CI instructions 312 in a CI instruction region 313 as CIDD instructions to be replayed in a misprediction recovery illustrated in the instruction stream 318 in FIG. 3B to avoid this potential illegal load condition.

A store-based CD instruction can also have a data dependency with a load-based CI instruction based on an "added" CD store in a correct instruction control flow path resulting from execution of a conditional control instruction in misprediction recovery. In this regard, FIG. 4A is an instruction stream 400 in flowchart form illustrating a load-based CI instruction 402 in CI instructions 404 in a CI instruction region 405 in a CI instruction control flow path 406 ("CI path 406") that loads data at memory location [A] into 'Y'. However, the load-based CI instruction 402 is a load-based CI, data independent (CIDI) instruction when a CD predicted instruction control flow path 408 ("CD predicted path 408") is taken from a conditional branch instruction 410. This is because no CD instructions 412 in a CD instruction region 413 in the CD predicted path 408 have a data dependency with the load-based CI instruction 402 as shown in FIG. 4A. However, as shown in instruction stream 414 in FIG. 4B, if during execution of the conditional branch instruction 410, it is determined that the condition of the conditional branch instruction 410 is actually evaluated to the not taken CD actual instruction control flow path 416 ("CD actual path 416"), this means a misprediction occurred earlier when the condition of the conditional branch instruction 410 was predicted to be taken. CD instructions 418 in a CD instruction region 419 in the CD actual path 416 of the instruction stream 414 will then executed by the processor in a misprediction recovery.

As shown in FIG. 4B, the load-based CI instruction 402 is present in the CI path 406. However, a store-based CD instruction 420 is in the CD instructions 418 in the CD actual path 416 that stores 'X' at memory location [A]. The load-based CI instruction 402 loads the data at memory location [A] into 'Y', and is thus a CIDD instruction when the CD actual path 416 is taken. Thus, if the load-based CI instruction 402 has already been executed as a result of being processed when the CD predicted path 408 was taken as a result of a misprediction of the conditional control instruction 410 in FIG. 4A, a processor can be configured to detect the added store-based CD instruction 420 having the store-forward memory dependency with the load-based CI instruction 402 and cause the instruction pipeline to be flushed and re-executed to correctly load 'X' into 'Y'.

An added store-based CD instruction in misprediction recovery can also have a data dependency with an intermediate stored-based CI instruction having a memory dependency with a load-based CI instruction, which also results in an illegal forwarding of data to the load-based CI instruction. In this regard, FIG. 5A is an instruction stream 500 in flowchart form illustrating a load-based CI instruction 502 in CI instructions 504 in a CI instruction region 505 in a CI instruction control flow path 506 ("CI path 506") that loads data at memory location [B] into 'Y'. The CI instructions 504 also include a store-based CI instruction 508 that stores 'X' into memory location [A]. There are no instructions in CD instructions 512 in a CD instruction region 513 that are memory dependent with the store-based CI instruction 508 and the load-based CI instruction 502, which are thus both CIDI instructions. Thus, if 'B' is not equal to 'A', 'Y' will not be loaded with 'X' in the load-based CI instruction 502.

However, as shown in instruction stream 516 in FIG. 5B, if during execution of the conditional control instruction 510, it is determined that the condition of the conditional control instruction 510 is actually evaluated to the not taken CD actual instruction control flow path 518 ("CD actual path 518"), this means a misprediction occurred earlier when the condition of the conditional control instruction 510 was predicted to be taken. CD instructions 520 in a CD instruction region 521 in the CD actual path 518 of the instruction stream 516 will then executed by the processor in a misprediction recovery. The CD instructions 520 in FIG. 5B include a store-based CD instruction 522 that stores 'A+1' into 'A'. Thus, the store-based CI instruction 508 has a memory dependency with the store-based CD instruction 522 such that the store-based CI instruction 508 is a CIDI instruction if the CD actual path 518 is taken, as opposed to the CD predicted path 514 in FIG. 5A. Thus, if the operation of the store-based CD instruction 522 causes 'A'='B', the store-forward dependence of the store-based CI instruction 508 on the store-based CD instruction 522 will cause 'X' to be forwarded to 'Y' such that 'Y'='X'. Thus, if the load-based CI instruction 502 has already been executed as a result of being processed when the CD predicted path 514 was taken as a result of a misprediction of the conditional control instruction 510 in FIG. 5A, a processor can be configured to detect the added store-based CD instruction 522 having the store-forward memory dependency with the load-based CI instruction 502 and cause the instruction pipeline to be flushed and re-executed.

In each of the examples in FIGS. 2A-5B above, the instruction pipeline is flushed and all CI instructions are re-executed in misprediction recovery to avoid the various illegal load scenarios. These illegal load scenarios can result from removed and/or added CD stores from store-based CD instructions in either CD predicted paths taken as a result of a conditional control instruction misprediction and/or CD actual paths taken after a conditional control instruction misprediction. This can result in execution delay in the instruction pipeline and increased power consumption, because not all the CI instructions in the CD actual paths taken in misprediction recovery are CIDD instructions. For example, some of these CI instructions may not have a store-forward data dependency on a CD instruction in the CD predicted path in the case of a removed CD store, and thus are CIDI instructions. CIDI instructions do not have to be re-executed in misprediction recovery, because CIDI instructions are both control and data independent of the control instruction control flow path taken from a conditional control instruction.

In this regard, in examples disclosed herein, load-based CI instructions are identified in misprediction recovery to determine if the load-based CI instructions have a store-forward data dependency, also referred to as store-forward dependency (SFD). If a load-based CI instruction is identified as having a store-forward dependency in misprediction recovery, this means the store-based instruction that produces the forwarded store data to be consumed by the load-based CI instruction was executed in an instruction stream as a result of a mispredicted, incorrect instruction control flow path taken. Thus, in misprediction recovery, the store-based instruction having a store-forward dependency with the load-based CI instruction may produce a different store result and/or be "removed" from the instruction control flow path as having been a store-based CD instruction in the incorrect taken instruction control flow path. Load-based CI instructions identified as having store-forward dependency can be selectively designated as load-based CIDD instructions. Load-based CIDD instructions can then be designated to be replayed (i.e., re-executed) by a processor during misprediction recovery to avoid a potentially incorrect load being consumed by the load-based CIDD instruction as a result of the forwarding of a store result from a stored-based instruction before the misprediction recovery. The replay of load-based CI instructions can be limited to replaying load-based CI instructions identified as load-based CIDD instructions. This is opposed to, for example, identifying all load-based CI instructions in misprediction recovery as load-based CIDD instructions for replay without distinguishing between load-based CIDI instructions and load-based CIDD instructions. Only replaying load-based CI instructions identified as having a store-forward dependency in misprediction recovery, as opposed to indiscriminately replaying all load-based CI instructions in misprediction recovery, can reduce execution delay in the instruction pipeline and power consumption in the processor.

In this regard, FIGS. 6A and 6B are instruction streams 600, 602, respectively, in flowchart form that illustrate tracking of store-forward memory dependencies between stores and CI loads in load-based CI instructions in a CI instruction stream. The tracking of store-forward memory dependencies follow a predicted, incorrect CD instruction control flow path ("CD predicted path 604") taken from a conditional control instruction 606, such as a conditional branch instruction, and an actual, correct CD instruction control flow path 608 ("CD actual path 608") taken during misprediction recovery. The instruction stream 600 in FIG. 6A includes pre-branch instructions 610 in a CI instruction region 611 in a pre-branch instruction control flow path 612 ("pre-branch path 612") before the conditional control instruction 606 is reached in the instruction stream 600. Thus, the pre-branch instructions 610 are CI instructions. The pre-branch instructions 610 include a store-based CI instruction 614 that stores 'W' into memory location [B]. Then, as shown in FIG. 6A, the instruction stream 600 includes CD instructions 616 in a CD instruction region 617 in the CD predicted path 604 as a result of predicting the condition in the conditional control instruction 606 as resulting in branch taken. The CD predicted path 604 includes store-based CD instruction 618 that stores 'X' into memory location [A]. As also shown in FIG. 6A, the instruction stream 600 includes CI instructions 620 in a CI instruction region 621 in a CI instruction control flow path 622 ("CI path 622") that is executed regardless of the predicted or evaluated result of the condition in the conditional control instruction 606. The CI instructions 620 include a load-based CI instruction 624 that loads the data in memory location [B] into 'Z'. The CI instructions 620 also include a load-based CI instruction 626 that loads the data in memory location [A] into 'Y'. Thus, the load-based CI instructions 624, 626 are store-forward dependent on the CI stores produced by store-based CI instruction 614 in the pre-branch path 612 and the store-based CD instruction 618 in the CD predicted path 604, respectively, because execution of store-based CI instruction 614 and store-based CD instruction 618 affect the data loaded into memory addresses [A] and [B], respectively, that are then used as source memory address locations for the load-based CI instructions 624, 626.

In this regard, in the example illustrated in FIG. 6A, a processor can be configured to track whether the load-based CI instructions in the CI path 622, such as load-based CI instructions 624, 626, have a store-forward dependency (SFD) on a store-based instruction. In this example, load-based CI instructions 624, 626 have a SFD on store-based CI instruction 614 and store-based CD instruction 618 when the CD predicted path 604 is taken. The processor can be configured to track when a store is forwarded as a store forward load (SFL) to the load-based CI instructions 624, 626 such that the load-based CI instructions 624, 626 are CIDD instructions. Thus, if the CD predicted path 604 was determined to have been mispredicted when the condition of the conditional control instruction 606 is resolved at execution, and the CD actual path 608 in FIG. 6B is taken is misprediction recovery, the processor can determine if any load-based CI instructions in the instruction stream 602, including load-based CI instructions 624, 626 are designated as CIDD instructions. For example, all load-based CI instructions may be designated as CIDI instructions as a default designation unless the load-based CI instructions are determined to have a SFD, in which case the load-based CI instructions are designated CIDD instructions. For any load-based CI instructions designated as CIDD instructions, the processor can be configured to replay (i.e., re-execute) in misprediction recovery when the CD actual path 608 is taken as shown in FIG. 6B so that the load-based CI instructions are re-executed. In this example, the load-based CI instructions 624, 626 would be designated as CIDD instructions by their SFD determined when the CD predicted path 604 is taken in FIG. 6A, and then replayed as CIDD instructions when the CD actual path 608 is taken in FIG. 6B.

FIG. 7 is a schematic diagram of an exemplary processor-based system 700 that includes a processor 702. As discussed in more detail below, the processor 702 is configured to track store-forward data dependencies for CI loads in load-based CI instructions to designate store-forward data dependent load-based instructions as load-based CIDD instructions. The processor 702 is further configured to limit the replay load-based CI instructions to those designated as load-based CIDD instructions in the CI instruction stream in misprediction recovery.

The processor 702 may be an in-order or an out-of-order processor (OoP) as examples. The processor 702 includes an instruction processing circuit 704. The instruction processing circuit 704 includes an instruction fetch circuit 708 that is configured to fetch instructions 706 from an instruction memory 710. The instruction memory 710 may be provided in or as part of a system memory in the processor-based system 700 as an example. An instruction cache 712 may also be provided in the processor 702 to cache the instructions 706 fetched from the instruction memory 710 to reduce latency in the instruction fetch circuit 708. The instruction fetch circuit 708 in this example is configured to provide the instructions 706 as fetched instructions 706F into one or more instruction pipelines $I_0$-$I_N$ as an instruction stream 714 in the instruction processing circuit 704 to be pre-processed, before the fetched instructions 706F reach an execution circuit 734 to be executed. The fetched instructions 706F in the instruction stream 714 include producer instructions and consumer instructions that consume produced values as a result of the instruction processing circuit 704 executing producer instructions. The instruction pipelines $I_0$-$I_N$ are provided across different processing circuits or stages of the instruction processing circuit 704 to pre-process and process the fetched instructions 706F in a series of steps that can be performed concurrently to increase throughput prior to execution of the fetched instructions 706F in the execution circuit 734. For example, fetched store-based instructions 706F identified as having store-forward loads in the instruction stream 714 can be identified by the instruction processing circuit 704 before being executed to be forwarded to be consumed by fetched consuming load-based instructions 706F.

A control flow prediction circuit 716 (e.g., a branch prediction circuit) is also provided in the instruction processing circuit 704 in the processor 702 in FIG. 7 to speculate or predict the outcome of a predicate of a fetched conditional control instruction 706F, such as a conditional branch instruction, that affects the instruction control flow path of the instruction stream 714 of the fetched instructions 706F processed in the instruction pipelines $I_0$-$I_N$. The prediction of the control flow prediction circuit 716 can be used by the instruction fetch circuit 708 to determine the next fetched instructions 706F to fetch based on the predicted target address. The instruction processing circuit 704 also includes an instruction decode circuit 718 configured to decode the fetched instructions 706F fetched by the instruction fetch circuit 708 into decoded instructions 706D to determine the instruction type and actions required, which may also be used to determine in which instruction pipeline $I_0$-$I_N$ the decoded instructions 706D should be placed. For example, the instruction fetch circuit 708 is configured to fetch CD instructions 706 in CD instruction regions following a conditional control instruction 706 and CI instructions 706 in a CI instruction region preceding or following the CD instruction regions. The decoded instructions 706D are placed in one or more of the instruction pipelines $I_0$-$I_N$ and are next provided to a rename circuit 720 in the instruction processing circuit 704. The rename circuit 720 is configured to determine if any register names in the decoded instructions 706D need to be renamed to break any register dependencies that would prevent parallel or out-of-order processing. The rename circuit 720 is configured to call upon a register map table (RMT) 722 to rename a logical source register operand and/or write a destination register operand of a decoded instruction 706D to available physical registers 724(1)-724(X) ($P_0$, $P_1$, . . . , $P_x$) in a physical register file (PRF) 726. The register map table (RMT) 722 contains a plurality of mapping entries each mapped to (i.e., associated with) a respective logical register $R_0$-$R_P$. The mapping entries are configured to store information in the form of an address pointer to point to a physical register 724(1)-724(X) in the physical register file (PRF) 726. Each physical register 724(1)-724(X)) in the physical register file (PRF) 724 contains a data entry configured to store data for the source and/or destination register operand of a decoded instruction 706D.

The instruction processing circuit 704 in the processor 702 in FIG. 7 also includes a register access circuit 728 prior to a dispatch circuit 730. The register access circuit 728 is configured to access a physical register 724(1)-724(X) in the physical register file (PRF) 726 based on a mapping entry mapped to a logical register $R_0$-$R_P$ in the register map table (RMT) 722 of a source register operand of a decoded instruction 706D to retrieve a produced value from an executed instruction 706E in the execution circuit 734. The register access circuit 728 is also configured to provide the retrieved produced value from an executed decoded instruction 706E as the source register operand of a decoded instruction 706D to be executed. Also, in the instruction processing circuit 704, the dispatch circuit 730 is provided in the instruction pipeline $I_0$-$I_N$ and is configured to dispatch a decoded instruction 706D to the execution circuit 734 to be executed when all source register operands for the decoded instruction 706D are available. For example, the dispatch circuit 730 is responsible for making sure that the necessary values for operands of a decoded consumer instruction 706D are available before dispatching the decoded consumer instruction 706D to the execution circuit 734 for execution. The operands of a decoded instruction 706D can include immediate values, values stored in memory, and produced values from other decoded instructions 706D that would be considered producer instructions to the consumer instruction. The execution circuit 734 is configured to execute decoded instructions 706D received from the dispatch circuit 730. A write circuit 732 is also provided in the instruction processing circuit 704 to write back or commit produced values from executed instructions 706E to memory, such as the physical register file (PRF) 726, cache memory, or system memory.

As discussed above, the instruction stream 714 can have conditional control instructions whose predicates are speculatively predicted by the control flow prediction circuit 716. Such prediction is used to determine which branch is taken to process a particular CD instruction region to process in the instruction stream 714 in the instruction pipeline $I_0$-$I_N$ following the conditional control instruction. As discussed above, the CD instructions 706 in the predicted instruction control flow path are processed based the prediction of the evaluation of predicate of the conditional control instruction 706. There are other CI instructions 706 in a CI instruction region(s) in the instruction stream 714 that are inserted in the instruction pipeline $I_0$-$I_N$ to get executed regardless of which instruction control flow path is taken as a result of predicting the outcome of the predicate of the conditional branch instruction 706. These instructions 706 are also known CI instructions 706. These CI instructions can be further classified based on their data dependence on CD in a CD region in the instruction stream 714. If for example, load CI instruction 706 is dependent on data stored by a store-based CD instruction 706, the CI instruction is a CIDD on the store-based CD instruction 706; otherwise, it is a CIDI on the store-based CD instruction 706.

The instruction processing circuit 704 is configured to execute a conditional control instruction 706D in the instruction stream 714 in the execution circuit 734 that was speculatively predicted by the control flow prediction circuit 716 to resolve the predicate of the conditional control instruction 706D and determine if the speculative prediction matches the resolved predicate from execution of the conditional control instruction 706D. If it is determined by the instruction processing circuit 704 that a conditional control instruction 706 was mispredicted when the predicate of the conditional control instruction 706 is resolved at execution by the execution circuit 734, the instruction processing circuit 704 is configured to execute a misprediction recovery. In misprediction recovery, the instruction processing circuit 704 may be configured to replay the instructions 706 in the instruction stream 714 back to the conditional control instruction 706 while including the CD instructions in the actual, correct instruction control flow path from resolution of the conditional control instruction 706. Thus, load-based CIDD instructions 706 that were processed or executed based on the speculative misprediction may have been based on stored CD data that was removed and/or other store CD data added.

To address the issue of CIDD instructions 706 having been executed based on later removed CD data in misprediction recovery, the instruction processing circuit 704 in this example includes a control independent determination circuit 736. The control independent determination circuit 736 is configured to determine if a load-based CI instruction 706D processed is store-forward dependent on a store-based instruction 706D in the instruction stream 714 in an instruction pipeline $I_0$-$I_N$ based on information received from a circuit in the instruction processing circuit 704, such as the dispatch circuit 730. The control independent determination circuit 736 is configured to determine if the load-based CI instruction 706 is SFD on a store-based instruction based on determining if a store produced by a store-based instruction 706 in the instruction stream 714 was forwarded for consumption to the load-based CI instruction 706. The control independent determination circuit 736 is configured to communicate if the load-based CI instruction 706D is SFD on a store-based instruction to the execution circuit 734. If the execution circuit 734 determined during execution of the conditional control instruction 706D that the speculative prediction by the control flow prediction circuit 716 did not match the resolved predicate in execution of the conditional control instruction 706D, the instruction processing circuit 704 is configured to process the fetched instructions 706F in a second CD instruction region in the instruction stream 714 taken based on the resolved predicate from execution of the conditional control instruction 706D in misprediction recovery. The load-based CI instruction 706D is executed in the instruction processing circuit 704 independent of the control flow of the resolution of the conditional control instruction 706D. If the execution circuit 734 determines that the load-based CI instruction 706D is SFD on a store-based instruction to the execution circuit 734 based on information about the load-based instruction received from the control independent determination circuit 736, the execution circuit 734 will replay (i.e., re-execute) the processed load-based CI instruction 706D in misprediction recovery. Replaying a decoded instruction 706D means to execute the decoded instruction 706D that was previously processed in the instruction processing circuit 704 and/or executed.

However, if the load-based CI instruction 706D is not SFD on the store-based instruction, the execution circuit 734 will not re-execute the processed load-based CI instruction 706D. For example, the control independent determination circuit 736 may be configured to designate the load-based CI instruction 706D not determined to be SFD on a store-based instruction as a CIDD instruction. The execution circuit 734 can be configured to not replay (i.e., re-execute) processed load-based CI instruction 706D in misprediction recovery that is designated as a CIDI instruction. In this manner, the processor 702 is configured to selectively designate the load-based CI instruction 706D determined as having a SFD on a store-based instruction as a CIDD instruction to be re-played instead of indiscriminately replaying all load-based CI instructions in misprediction recovery to reduce delay by re-executing CIDI instructions in the instruction stream 714 whose load data will not change based on the misprediction recovery, and thus reduce power consumption as a result.

As discussed previously with regard to the example instruction streams 600, 602 in FIGS. 6A and 6B, the store-based instruction that provides a SFL to a load-based CI instruction, and thus the load-based CI instruction, is deemed to be SFD on the store-based instruction can be a store-based CI instruction or store-based CD instruction. The control independent determination circuit 736 can be configured to determine if a load-based CI instruction is SFD on either a store-based CI instruction or store-based CD instruction, or only a store-based CD instruction. In the latter instance, the execution circuit 734 would only replay load-based CI instructions that are SFD on store-based CD instructions.

To further illustrate exemplary operation of the instruction processing circuit 704 in the processor 702 FIG. 7 selectively designating load-based CI instruction 706D determined as having a SFD on a store-based instruction as a CIDD instruction to be re-played in misprediction recovery, FIG. 8 is provided. FIG. 8 is a flowchart illustrating an exemplary process 800 of a processor, such as the processor 702 in FIG. 7, tracking SFD of CI loads in load-based CI instructions in an instruction stream and selectively designating determined SFD load-based CI instructions in the instruction stream in misprediction recovery as load-based CIDD instructions for replay. The process 800 in FIG. 8 is discussed with example to the processor 702 in FIG. 7.

In this regard, as illustrated in FIG. 8, the process 800 includes the instruction fetch circuit 708 of the instruction processing circuit 704 fetching a plurality of instructions 706 from a memory 710, 712 into an instruction pipeline $I_0$-$I_N$ among the one or more instruction pipelines $I_0$-$I_N$, the plurality of fetched instructions 706 in the one or more instruction pipelines $I_0$-$I_N$ comprising an instruction stream 714 comprising at least one CI instruction region and a plurality of CD instruction regions (block 802). The process 800 also includes the instruction processing circuit 704 speculatively predicting a predicate in a conditional control instruction 706D in the instruction stream 714 (block 804). The process 800 also includes the instruction processing circuit 704 processing fetched instructions 706F in the instruction stream 714 comprising fetched instructions 706F in a first CD instruction region among the plurality of CD instruction regions in the instruction stream 714 taken based on the speculative prediction and a load-based CI instruction in a CI instruction region (block 806). The process 800 also includes the control independent determination circuit 736 determining if the load-based CI instruction 706D is a SFD load-based CI instruction 706D based on determining if a store produced by a store-based instruction 706D in the instruction stream was forwarded for consumption to the load-based CI instruction 706D (block 808). The process 800 also includes the execution circuit 734 in the instruction processing circuit 704 executing the conditional control instruction 706D to resolve the predicate of the conditional control instruction 706D to resolve the predicate of the conditional control instruction 706D (block 810). The process 800 also includes the execution circuit 734 in the instruction processing circuit 704 determining if the speculative prediction matches the resolved predicate from execution of the conditional control instruction 706D (block 812). In response to the speculative prediction not matching the resolved predicate in execution of the conditional control instruction 706D (block 814), the instruction processing circuit 704 processes the fetched instructions 706F in a second CD instruction region among the plurality of CD instruction regions in the instruction stream 714 taken based on the resolved predicate from execution of the conditional control instruction 706D and the load-based CI instruction 706D (block 816). The process 800 also involves re-executing the processed load-based CI instruction 706D in response to determining that the load-based CI instruction 706D is a SFD load-based CI instruction 706D (block 818).

FIG. 9 is a schematic diagram illustrating exemplary details of the control independent determination circuit 736 in the processor 702 in FIG. 7. As discussed above, the control independent determination circuit 736 is configured to track store-forward dependencies for CI loads in load-based CI instructions. The control independent determination circuit 736 is coupled to the instruction pipelines $I_0$-$I_N$ in the instruction processing circuit 704. The control independent determination circuit 736 is also configured to selectively designate SFD load-based CI instructions in the CI instruction stream in misprediction recovery as load-based CIDD instructions for replay by the instruction processing circuit 704 in the processor 702.

In this regard, the control independent determination circuit 736 includes a load memory dependence determination circuit 900 and a store-forward load (SFL) tracking circuit 902. The SFL tracking circuit 902 is configured to store one or more SFL entries each comprising SFL information for a tracked load-based instruction.

The SFL tracking circuit 902 is updated and consulted by the load memory dependence determination circuit 900 based on processed load-based CI instructions in the instruction stream 714 in the processor 702 in FIG. 7 to determine if the load-based CI instruction is SFD on a store-based instruction to determine if the load-based CI instruction should be designated as a load-based CIDD instruction for replay. The load memory dependence determination circuit 900 is configured to receive a load ID 904 identifying a load-based instruction in the instruction stream 714. The load memory dependence determination circuit 900 may also be configured to receive an instruction ID 906 identifying a conditional control instruction 706 determined by the execution circuit 734 to have been mispredicted in the instruction processing circuit 704, and thus instructions 706 in the instruction stream 714 having been processed in a CD instruction region based on an incorrect, predicated instruction control flow path. The load memory dependence determination circuit 900 may also be configured to receive mispredicted instruction information 908 about the mispredicted conditional control instruction 706 identified by the instruction ID 906. The load memory dependence determination circuit 900 is also configured to output CIDD information 910 indicating to the execution circuit 734 if a load-based CI instruction is determined to be designated as a load-based CIDD instruction as having a CIDD load so that the execution circuit 734 will replay such load-based CI instruction. For example, the load memory dependence determination circuit 900 may be configured to generate a list 912 of load-based CI instructions determined to be load-based CIDD instructions according to their load IDs. Also in this example, the load memory dependence determination circuit 900 may be configured to receive an indication of any instructions that are younger 918 than the mispredicted conditional control instruction 706 identified by the instruction information 908, which information can be used to determine if a load-based CI instruction 706 should be designated as a load-based CIDD instruction.

With continuing reference to FIG. 9, the load memory dependence determination circuit 900 is configured to consult the SFL tracking circuit 902 to establish SFL entries for received load IDs for tracking corresponding load-based CI instructions to determine if the load-based CI instructions are SFD on store-based instructions. The SFL tracking circuit 902 is configured to receive SFL information 914 from a store-to-load (STL) forwarding circuit 916 as part of the instruction processing circuit 704 to provide store forwarding information about load-based CI instructions to update the tracking information in the SFL tracking circuit 902 as will be described below. FIG. 10 illustrates an example of a store-forward tracking memory 1000 that is contained in or part of the SFL tracking circuit 902 in FIG. 9 to tracking corresponding load-based CI instructions to determine if the load-based CI instructions are SFD on store-based instructions. In this example, the store-forward tracking memory 1000 is configured to store a plurality of SFL entries 1002(1)-1002(N) each configured to store a load ID indicator 1004 for storing a load ID instruction, a store-forward load (SFL) indicator 1006 for storing a state indicating if a load-based CI instruction consumes a SFL produced by the store-based instruction, and a forward store indicator (FSID) 1008 for storing a store ID of the store-based instruction that the load-based CI instruction indicated by the load ID in the load ID indicator 1004 is store-forward dependent on. For example, as shown in SFL entry 1002(0) in the store-forward tracking memory 1000, load ID '15' is stored in load ID indicator 1004 to identify a load-based CI instruction. The SFL indicator 1006 being '1' in SFL entry 1002(0) indicates a SFL true state, meaning that the load-based CI instruction of load ID '15' has a SFD on a store-based instruction. The store ID identifying the store-based instruction that the load-based CI instruction in the SFL entry 1002(0) is SFD is in the FSID indicator 1008 in SFL entry 1002(2), which is store ID '1'. A '0' entry in the SFL indicator 1006 in this example indicates a SFL false state, meaning that the load-based CI instruction identified by the load ID in the load ID indicator 1004 of a SFL entry 1002(0)-1002(N) has not been determined to be SFD on a store-based instruction.

In the example of the SFL tracking circuit 902 in FIG. 9, the SFL tracking circuit 902 is configured to store load IDs 904 of load-based CI instructions 706 in SFL entries 1002(0)-1002(N) in an out-of-order fashion. In this example, all load-based CI instructions in a CI instruction region will be communicated as SFL information 914 from the STL forwarding circuit 916 to the SFL tracking circuit 902. The SFL tracking circuit 902 will establish a new SFL entry 1002(0)-1002(N) in the store-forward tracking memory 1000 in response to execution of the any instructions that produce CI loads to be consumed by load-based CI instructions 706. The SFL state and the FSID for the load-based CI instruction 706 is provided to the SFL tracking circuit 902 at the execution time of the load-based CI instruction 706 by the STL forwarding circuit 916. When a CI load generated by a store-based instruction 706 becomes non-speculative, the SFL entry 1002(0)-1002(N) in the store-forward tracking memory 1000 with the load ID identifying the load-based instruction that is SFD on the CI load can be de-allocated and such SFL entry 1002(0)-1002(N) freed for another entry.

With reference to FIG. 9, the control independent determination circuit 736 is configured to determine if the load-based CI instruction 706 is a SFD load-based CI instruction based on determining if a store produced by a store-based instruction 706 in the instruction stream 714 was forwarded for consumption to the load-based CI instruction 706. In response to the load memory dependence determination circuit 900 determining that the load-based CI instruction is a SFD load-based CI instruction, the control independent determination circuit 736 is configured to store SLF information 914 in a SFL entry 1002(0)-1002(N) designating the load-based CI instruction as a load-based CIDD instruction. The control independent determination circuit 736 is configured to indicate if a load-based CI instruction is a load-based CIDD instruction to the execution circuit 734 through the CIDD information 910 or the list of CIDD instructions 912. If the execution circuit 734 determines that the speculative prediction for an executed conditional control instruction 706 does not match the resolved predicate, the execution circuit 734 is configured to determine if an executed load-based CI instruction 706 is a SFD load-based CI instruction based on the SFL information 914 in the SFL entry 1002(0)-1002(N) for the load-based CI instruction in the SFL tracking circuit 902. The load memory dependence determination circuit 900 is configured to designate the load-based CI instruction 706 as a load-based CIDD instruction by receiving updated SLF information 914 from the STL forwarding circuit 916 to designate a load-based CI having a SFD on a store-based instruction as a load-based CIDD instruction. The execution circuit 734 can then mark the load-based CIDD instruction for replay during misprediction recovery. The load memory dependence determination circuit 900 is also configured to designate the load-based CI instruction 706 as a load-based CIDI instruction by receiving updated SLF information 914 from the STL forwarding circuit 916 to designate a load-based CI instruction not having a SFD on a store-based instruction as a load-based CIDD instruction.

In one example, a SFD between a load-based CI instruction 706 and a store-based instruction is based on determining if the forward CI load data to the load-based CI instruction is an "active" store. An active store is a store operation from processing a store-based instruction that has been forwarded to a consuming load-based instruction in the instruction pipeline, but has not yet been committed to memory. An inactive store is a store operation that is no longer speculative and may have committed (i.e., written back) to memory. Identifying load-based CI instructions based on an active store as a load-based CIDD instructions for replay is based on the recognition that "removed" CD stores are the cause of CIDD instructions being executed with incorrect stored data. "Removed" CD stores are store operations resulting from store-based CD instructions in a predicted instruction control flow path later found to have been mispredicted. In contrast, "added" CD stores are stores resulting from CD store instructions that are "added" as being in a correct instruction data path executed as a result of a misprediction recovery. In misprediction recovery, store-based CD instructions in the mispredicted instruction control flow path are effectively "removed" as a result of loading and executing the correct instruction control flow path. Removed CD stores that were consumed by load-based CI instructions cause functional faults if such load-based CI instructions are not replayed, because otherwise, the previous execution of such load-based CI instructions based on a removed CD store from the mispredicted instruction control flow path will otherwise stand. If a load-based CI instruction was executed based on active stored data, this means the store data consumed by load-based CI instructions could change in misprediction recovery as not yet committed. Thus, load-based CI instructions only identified as having a SFD on an active store can be selectively identified as load-based CIDD instructions for replay. If a load-based CI instruction was executed based on inactive stored data, meaning stored data that was committed to memory, the processor need not identify such load-based CI instruction as a load-based CIDD instruction for replay. This is because stored data is only committed if the predicate of the predicted condition has been resolved as true. If stored data consumed by a load-based CI instruction has been committed, this means a store-based CD instruction in the correct instruction control flow path has replaced the previously stored data by the store-based CD instruction in the incorrect instruction control flow path. Thus, a load-based CI instruction that was not executed based on an active store is identified as a load-based CIDI instruction and is not replayed.

In this regard, FIG. 11A is an instruction stream 1100 in flowchart form that illustrates the control independent determination circuit 736 in FIG. 9 tracking SFD based on a forwarded CD store from a store-based instruction 706 to a load-based CI instruction 706 in a CI instruction stream being an active store to be replayed in misprediction recovery. FIG. 11B is an instruction stream 1102 in flowchart form to illustrate the control independent determination circuit 736 in FIG. 9 designating a load-based CI instruction in FIG. 11A having a SFD on an active store as a load-based CIDD instruction for replay.

In this regard, as illustrated in FIGS. 11A, 11B, the tracking of store-forward dependencies follow a predicted, incorrect CD instruction control flow path 1104 ("CD predicted path 1104") taken from a conditional control instruction 1106, such as a conditional branch instruction, and an actual, correct CD instruction control flow path 1108 ("CD actual path 1108") taken during misprediction recovery. The instruction stream 1100 in FIG. 11A includes pre-branch instructions 1110 in a CI instruction region 1111 in a pre-branch instruction control flow path 1112 ("pre-branch path 1112") before the conditional control instruction 1106 is reached in the instruction stream 1100. Thus, the pre-branch instructions 1110 are CI instructions. The pre-branch instructions 1110 include a store-based CI instruction 1114 that stores 'W' into memory location [B]. Then, as shown in FIG. 11A, the instruction stream 1100 includes CD instructions 1116 in a CD instruction region 1117 in the CD predicted path 1104 as a result of predicting the condition in the conditional control instruction 1106 as resulting in branch taken. The CD predicted path 1104 includes store-based CD instruction 1118 that stores 'X' into memory location [A]. As also shown in FIG. 11A, the instruction stream 1100 includes CI instructions 1120 in a CI instruction region 1121 in a CI instruction control flow path 1122 ("CI path 1122") that are executed regardless of the predicted or evaluated result of the condition in the conditional control instruction 1106. The CI instructions 1120 include a load-based CI instruction 1124 that loads the data in memory location [B] into 'Z'. The CI instructions 1120 also include a load-based CI instruction 1126 that loads the data in memory location [A] into 'Y'. Thus, the load-based CI instructions 1124, 1126 are SFD on the CI stores produced by store-based CI instruction 1114 in the pre-branch path 1112 and the store-based CD instruction 1118 in the CD predicted path 1104, respectively, because execution of store-based CI instruction 1114 and store-based CD instruction 1118 affect the data loaded into memory addresses [A] and [B], respectively, that are then used as source memory address locations for the load-based CI instructions 1124, 1126.

In this regard, in the example illustrated in FIG. 11A, the control independent determination circuit 736 in FIG. 9 can be configured to track whether the load-based CI instructions in the CI path 1122, such as load-based CI instructions 1124, 1126, have a store-forward dependency (SFD) on a store-based instruction. In this example, load-based CI instructions 1124, 1126 have a SFD on store-based CI instruction 1114 and store-based CD instruction 1118 when the CD predicted path 1104 is taken. The control independent determination circuit 736 can be configured to track when an active store is forwarded to a load-based CI instruction as a CIDD instruction. In this example, load-based CI instruction 1126 is forwarded an active store from store-based CD instruction 1118 since store-based CD instruction 1118 is produced as a speculative CD store that will not be resolved before load-based CI instruction 1126 executes in the event of a speculative misprediction. However, load-based CI instruction 1124 is forwarded a non-active store from store-based CI instruction 1114 as a non-speculative CI store that can be resolved without changing before load-based CI instruction 1126 executes in the event of a speculative misprediction. Thus, load-based CI instruction 1126 is designated as a load-based CIDD instruction, whereas load-based CI instruction 1124 is designated as a load-based CIDI instruction. Thus, if the CD predicted path 1104 is determined to have been mispredicted when the condition of the conditional control instruction 1106 is resolved at execution, and the CD actual path 1108 in FIG. 11B is taken is misprediction recovery, the control independent determination circuit 736 can determine if any load-based CI instructions in the instruction stream 1102, including load-based CI instructions 1124, 1126 are designated as CIDD instructions. In this example, load-based CI instruction 1126 will be marked as a load-based CIDD instruction for replay in misprediction recovery as being SFD on an active store, whereas load-based CI instruction 1124 will not be marked as a load-based CIDD for replay in misprediction recovery as not being SFD on an active store.

Other methods exist to determine if a CI load-based instruction is SFD on a store-based CD instruction. For example, FIG. 12A is an instruction stream 1200 in flowchart form that illustrates the control independent determination circuit 736 in FIG. 9 tracking store instruction IDs of store-based instructions that produce stores forwarded as CI loads of load-based CI instructions in a CI instruction stream following a predicted, incorrect CD instruction control flow path taken from a conditional control instruction. FIG. 12B is an instruction stream 1202 in flowchart form to illustrate the control independent determination circuit 736 in FIG. 9 designating the load-based CI instruction in FIG. 12A as a load-based CIDD instruction for replay if its forwarding store instruction ID indicates the corresponding store-based instruction is not older than the conditional control instruction.

In this regard, as illustrated in FIG. 12A, the tracking of store-forward dependencies follow a predicted, incorrect CD instruction control flow path 1204 ("CD predicted path 1204") taken from a conditional control instruction 1206, such as a conditional branch instruction, and an actual, correct CD instruction control flow path 1208 ("CD actual path 1208") taken during misprediction recovery. The instruction stream 1200 in FIG. 12A includes pre-branch instructions 1210 in a CI instruction region 1211 in a pre-branch instruction control flow path 1212 ("pre-branch path 1212") before the conditional control instruction 1206 is reached in the instruction stream 1200. Thus, the pre-branch instructions 1210 are CI instructions. The pre-branch instructions 1210 include a store-based CI instruction 1214 that stores 'W' into memory location [B]. Then, as shown in FIG. 12A, the instruction stream 1200 includes CD instructions 1216 in a CD instruction region 1217 in the CD predicted path 1204 as a result of predicting the condition in the conditional control instruction 1206 as resulting in branch taken. The CD predicted path 1204 includes store-based CD instruction 1218 that stores 'X' into memory location [A]. As also shown in FIG. 12A, the instruction stream 1200 includes CI instructions 1220 in a CI instruction region 1221 in a CI instruction control flow path 1222 ("CI path 1222") that are executed regardless of the predicted or evaluated result of the condition in the conditional control instruction 1206. The CI instructions 1220 include a load-based CI instruction 1224 that loads the data in memory location [B] into 'Z'. The CI instructions 1220 also includes a load-based CI instruction 1226 that loads the data in memory location [A] into 'Y'. Thus, the load-based CI instructions 1224, 1226 are SFD on the CI stores produced by store-based CI instruction 1214 in the pre-branch path 1212 and the store-based CD instruction 1218 in the CD predicted path 1204, respectively, because execution of store-based CI instruction 1214 and store-based CD instruction 1218 affect the data loaded into memory addresses [A] and [B], respectively, that are then used as source memory address locations for the load-based CI instructions 1224, 1226.

In this regard, in the example illustrated in FIG. 12A, the control independent determination circuit 736 in FIG. 9 can be configured to track whether the load-based CI instructions in the CI path 1222, such as load-based CI instructions 1224, 1226, have a store-forward dependency (SFD) on a store-based instruction. In this example, load-based CI instructions 1224, 1226 have a SFD on store-based CI instruction 1214 and store-based CD instruction 1218 when the CD predicted path 1204 is taken. The control independent determination circuit 736 can be configured to track when a store is forwarded to a load-based CI instruction as a CIDD instruction. In this example, load-based CI instruction 1226 is forwarded a store from store-based CD instruction 1218 since store-based CD instruction 1218 stores 'X' into memory location [A]. Load-based CI instruction 1224 is forwarded a store from store-based CI instruction 1214. Thus, load-based CI instructions 1224, 1226 are designated as load-based CIDD instructions. This SFD between the load-based CI instructions 1224, 1226 and the respective store-based instructions 1214, 1218 are tracked by the control independent determination circuit 736 in FIG. 9 as load-based CIDD instructions. Thus, if the CD predicted path 1204 is determined to have been mispredicted when the condition of the conditional control instruction 1206 is resolved at execution, and the CD actual path 1208 in FIG. 12B is taken is misprediction recovery, the control independent determination circuit 736 can determine if any load-based CI instructions in the instruction stream 1202, including load-based CI instructions 1224, 1226 are designated as CIDD instructions.

In this example, the control independent determination circuit 736 is configured to determine if load-based CI instructions 1224, 1226 are older or younger than the conditional control instruction 1206 based on their respective load IDs from the SFL tracking circuit 902 and the instruction ID 906 as shown in FIG. 9. If the SFL of the load-based CI instruction 1224 is younger by its FSID being '1' in this example with the conditional control instruction 1206 having an instruction ID 906 of '3', this means that the load-based CI instruction 1224 is not SFD on a CD instruction 1216 in the CD predicated path 1204 in FIG. 12A taken from the conditional control instruction 1206. Thus in this example, the control independent determination circuit 736 can override the CIDD designation of the load-based CI instruction 1224 as not being a load-based CIDD instruction or being a load-based CIDI instruction. Also in this example, with the SFL of the load-based CI instruction 1224 having an FSID of '7' being older than the conditional control instruction 1206 having an instruction ID 906 of '3', this means that the load-based CI instruction 1224 is SFD on a CD instruction 1216 in the CD predicated path 1204 in FIG. 12A taken from the conditional control instruction 1206. Thus, as shown in FIG. 12B, the load-based CI instruction 1226 will be marked as a load-based CIDD instruction for replay in misprediction recovery as being SFD on a CD instruction 1216 in the CD predicated path 1204, whereas load-based CI instruction 1224 will not be marked as a load-based CIDD for replay in misprediction recovery as being SFD on a CI instruction 1216.

FIG. 13A illustrates an instruction stream 1300 to illustrate the tracking of store-forward dependencies following a predicted, incorrect CD instruction control flow path 1304 ("CD predicted path 1304") taken from a conditional control instruction 1306, such as a conditional branch instruction, and an actual, correct CD instruction control flow path 1308 ("CD actual path 1308") taken during misprediction recovery. The instruction stream 1300 in FIG. 13A includes pre-branch instructions 1310 in a CI instruction region 1311 in a pre-branch instruction control flow path 1312 ("pre-branch path 1312") before the conditional control instruction 1306 is reached in the instruction stream 1300. Thus, the pre-branch instructions 1310 are CI instructions. The pre-branch instructions 1310 include a store-based CI instruction 1314 that stores 'W' into memory location [B]. Then, as shown in FIG. 13A, the instruction stream 1300 includes CD instructions 1316 in a CD instruction region 1317 in the CD predicted path 1304 as a result of predicting the condition in the conditional control instruction 1306 as resulting in branch taken. The CD predicted path 1304 includes store-based CD instruction 1318 that stores 'X' into memory location [A]. As also shown in FIG. 13A, the instruction stream 1300 includes CI instructions 1320 in a CI instruction region 1321 in a CI instruction control flow path 1322 ("CI path 1322") that are executed regardless of the predicted or evaluated result of the condition in the conditional control instruction 1306. The CI instructions 1320 includes a load-based CI instruction 1324 that loads the data in memory location [B] into 'Z'. The CI instructions 1320 also includes a load-based CI instruction 1326 that loads the data in a memory location [A] into 'Y'. Thus, the load-based CI instructions 1324, 1326 are store-forward dependent on the CI stores produced by store-based CI instruction 1314 in the pre-branch path 1312 and the store-based CD instruction 1318 in the CD predicted path 1304, respectively, because execution of store-based CI instruction 1314 and store-based CD instruction 1318 affect the data loaded into memory addresses [A] and [B], respectively, that are then used as source memory address locations for the load-based CI instructions 1324, 1326.

In the example in FIG. 13A, the control independent determination circuit 736 in FIG. 9 can be configured to track whether the load-based CI instructions in the CI path 1322, such as load-based CI instructions 1324, 1326, have a store-forward dependency (SFD) on a store-based instruction. In this example, load-based CI instructions 1324, 1326 have a SFD on store-based CI instruction 1314 and store-based CD instruction 1318 when the CD predicted path 1304 is taken. The control independent determination circuit 736 can be configured to track when a store is forwarded to a load-based CI instruction as a CIDD instruction. In this example, load-based CI instruction 1326 is forwarded a store from store-based CD instruction 1318 since store-based CD instruction 1318 stores 'X' into memory location [A]. Load-based CI instruction 1324 is forwarded a store from store-based CI instruction 1314. Thus, load-based CI instructions 1324, 1326 are designated as load-based CIDD instructions. This SFD between the load-based CI instructions 1324, 1326 and the respective store-based instructions 1314, 1318 are tracked by the control independent determination circuit 736 in FIG. 9 as load-based CIDD instructions. Thus, if the CD predicted path 1304 is determined to have been mispredicted when the condition of the conditional control instruction 1306 is resolved at execution, and the CD actual path 1308 in FIG. 13B is taken is misprediction recovery, the control independent determination circuit 736 can determine if any load-based CI instructions in the instruction stream 1302, including load-based CI instructions 1324, 1326 are designated as CIDD instructions.

In this example, the control independent determination circuit 736 is configured to determine if store-based instructions 1314, 1318 are older or younger according to their FSIDs for the load-based CI instructions 1324, 1326 (based on their load ID) in the SFL tracking circuit 902, than the most recent committed store ID in the instruction stream 1302 in FIG. 13B in misprediction recovery. If the FSIDs for the load-based CI instructions 1324, 1326 are younger by their FSID than the most recent committed store ID, the load-based CI instructions 1324, 1326 that have a SFD to a store-based instruction based on its FSID will be designated as a load-based CIDD instruction, otherwise it will not be designated as a load-based CIDD instruction. In this example, load-based CI instruction 1324 has a SFD based on a store-based instruction having a FSID of '1', whereas load-based CI instruction 1326 has a SFD based on a store-based instruction having a FSID of '7'. This means that the load-based CI instruction 1324 is not SFD on a CD instruction 1316 in the CD predicted path 1304 in FIG. 13A taken from the conditional control instruction 1306, whereas the load-based CI instruction 1326 is SFD on a CD instruction 1316 in the CD predicted path 1304 in FIG. 13A taken from the conditional control instruction 1306. Thus, in this example, the control independent determination circuit 736 can override the CIDD designation of the load-based CI instruction 1324 as not being a load-based CIDD instruction or being a load-based CIDI instruction, and load-based CI instruction 1326 be designated or left designated as a load-based CIDD instruction for replay in misprediction recovery as being SFD on a CD instruction 1316 in the CD predicted path 1304.

The tracking of store-forward loads for load-based CI instructions can also be tracked by the processor 702 in FIG. 7 by tracking the store loads forwarded by the store-based instructions 706 in the instruction stream 714 from the perspective of the store-based instruction. In FIG. 9 discussed above, the processor 702 in FIG. 7 tracked the store loads forwarded by the store-based instructions 706 in the instruction stream 714 from the perspective of the load-based instruction 706. In this regard, FIG. 14 is a schematic diagram illustrating exemplary details of an alternative control independent determination circuit 1436 that could be the control independent determination circuit 736 in the processor 702 in FIG. 7. The control independent determination circuit 1436 is configured to track store-forward dependencies for CI loads in load-based CI instructions based on tracking store-forward loads forwarded based on the processing of the store-based instructions 706 in the instruction stream 714. The control independent determination circuit 1436 can be coupled to the instruction pipelines $I_0$-$I_N$ in the instruction processing circuit 704. The control independent determination circuit 1436 is also configured to selectively designate SFD load-based CI instructions in the CI instruction stream in misprediction recovery as load-based CIDD instructions for replay by the instruction processing circuit 704 in the processor 702.

In this regard, the control independent determination circuit 1436 includes a load memory dependence determination circuit 1400 and a store-forward load (SFL) tracking circuit 1402. The SFL tracking circuit 1402 is configured to store one or more SFL entries each comprising SFL information for a tracked load-based instruction from the perspective of a store-based instruction 706. The SFL tracking circuit 1402 is updated and consulted by the load memory dependence determination circuit 1400 based on processed store-based instructions in the instruction stream 714 in the processor 702 in FIG. 7 to determine if the store-based CI instructions have a SFD on a load-based CI instruction to determine if the load-based CI instruction should be designated as a load-based CIDD instruction for replay. The load memory dependence determination circuit 1400 is configured to receive a store ID 1404 identifying a store-based instruction 706 in the instruction stream 714. The load memory dependence determination circuit 1400 is also configured to receive a load ID 1405 identifying a load-based CI instruction 706 that receive a forwarded-store from a store-based instruction 706 the instruction stream 714. The load memory dependence determination circuit 1400 may also be configured to receive an instruction ID 1406 identifying a conditional control instruction 706 determined by the execution circuit 734 to have been mispredicted in the instruction processing circuit 704, and thus instructions 706 in the instruction stream 714 having been processed in a CD instruction region based on an incorrect, predicated instruction control flow path. The load memory dependence determination circuit 1400 may also be configured to receive mispredicted instruction information 1408 about the mispredicted conditional control instruction 706 identified by the instruction ID 1406. The load memory dependence determination circuit 1400 is also configured to output a CIDD information 1410 indicating to the execution circuit 734 if a load-based CI instruction is determined to be designated as a load-based CIDD instruction as having a CIDD load so that the execution circuit 734 will replay such load-based CI instruction. For example, the load memory dependence determination circuit 1400 may be configured to generate a list 1412 of load-based CI instructions determined to be load-based CIDD instructions according to their load IDs. Also in this example, the load memory dependence determination circuit 1400 may be configured to receive an indication of any instructions that are younger 1418 than the mispredicted conditional control instruction 706 identified by the instruction ID 1406, which information can be used to determine if a load-based CI instruction 706 should be designated as a load-based CIDD instruction.

With continuing reference to FIG. 14, the load memory dependence determination circuit 1400 is configured to consult the SFL tracking circuit 1402 to establish SFL entries for received store IDs 1404 for tracking corresponding store-based CI instructions to determine if the store-based CI instructions have SFD with load-based CI instructions. The SFL tracking circuit 1402 is configured to receive SFL information 1414 from a STL forwarding circuit 1416 as part of the instruction processing circuit 704 to provide store forwarding information about instructions to update the tracking information in the SFL tracking circuit 1402 as will be described below. FIG. 15 illustrates an example of a store-forward tracking memory 1500 that is contained in or part of the SFL tracking circuit 1402 in FIG. 14 to tracking corresponding store-based instructions 706 to determine if the store-based instructions 706 have a SFD on a load-based CI instruction 706. In this example, the store-forward tracking memory 1500 is configured to store a plurality of SFL entries 1502(1)-1502(N) each configured to store a store ID indicator 1504 for storing a store ID instruction 706, a valid indicator 1506, a load list indicator 1508 indicating load IDs for load-based CI instructions 706 that are SFD on the store ID instruction 706 identified by the store ID in the store ID indicator 1504, and an overflow indicator 1510. For example, as shown in SFL entry 1502(0) in the store-forward tracking memory 1500, store ID '1' is stored in store ID indicator 1504 to identify a store-based instruction 706 was encountered in the instruction stream 714. A '1' in the valid indicator 1506 of the SFL entry 1502(0) indicates the entry is valid. Load ID '15' is in the load list indicator 1508 of SFL entry 1502(0) to indicate that load-based CI instruction 706 having load ID '15' is SFD on the store-based instruction 706 identified by store ID '1'. The overflow indicator 1510 is '0' for SFL entry 1502(0) indicating that there is not an overflow of load-based instructions 706 identified as being SFD with the store-based instruction 706 identified by store ID '1' stored in the SFL entry 1502(0). An overflow indicator 1510 of '1' indicates there are more load-based instructions 706 identified being SFD with the store-based instruction 706 for the store ID than can be stored in the SFL entry 1502(0)-1502(N).

In the example of the SFL tracking circuit 1402 in FIG. 14, the SFL tracking circuit 1402 is configured to store the store IDs 1404 of store-based instructions 706 in SFL entries 1502(0)-1502(N) in an out-of-order fashion. In this example, all store-based CI instructions 706 will be communicated as SFL information 1414 from the STL forwarding circuit 1416 to the SFL tracking circuit 1402. The SFL tracking circuit 1402 will establish a new SFL entry 1502(0)-1502(N) in the SFL tracking memory 1500 in response to processing store-based instructions 706 from rename circuit 720 as an example in the instruction processing circuit 704 in FIG. 7. SFL entry 1502(0)-1502(N) for the store ID 1404 is updated when a store-based instruction 706 is executed and determines a load-based instruction 706 to consume the forward store. In this regard, the valid indicator 1506 for the SFL entry 1502(0)-1502(N) is set to '1' to indicate valid, and the load ID 1405 of the load-based instruction 706 identified to consume the forwarded store is stored in the SFL entry 1502(0)-1502(N) corresponding to the store ID 1404. When a load-based CI instruction 706 receives store-forwarded data from a store-based instruction 706, the SFL entry 1502(0)-1502(N) containing the store ID 1404 for the store-based instruction 706 is updated to update the load ID 1405 that is SFD on the store-based instruction 706. If the forwarded loads at the store-based instruction's 706 execution is greater than the size of the load list indicator 1508 in the SFL entry 1502(0)-1502(N) containing the store ID 1404 of the store-based instruction 706, the overflow indicator 1510 is set to '1' in the SFL entry 1502(0)-1502(N).

A store-based CD instruction 706 in the mispredicted CD instruction path taken from execution of a conditional control instruction 706 causes the control independent determination circuit 1436 to search the SFL entries 1502(0)-1502(N) in the SFL tracking memory 1500. All SFL entries 1502(0)-1502(N) in the SFL tracking memory 1500 can be searched like a content addressable memory (CAM), or the store ID 1404 of the store-based instruction 706 can be searched associatively in the SFL entries 1502(0)-1502(N) of the SFL tracking memory 1500. The SFL entry 1502(0)-1502(N) containing the store ID 1404 of store-based CD instruction 706 in the mispredicted CD instruction path can be further consulted to determine the load IDs 1405 present in the load list indicator 1508 if the SFL entry 1502(0)-1502(N) is valid, indicated by a '1' in the valid indicator 1506 in this example. Load-based instructions 706 having their load ID 1405 stored in the load list indicator 1508 of the SFL entry 1502(0)-1502(N) means that the load-based instruction 706 is SFD on the store-based instruction 706 identified by the store ID 1404 in the corresponding SFL entry 1502(0)-1502(N). Thus, the load-based CI instructions 706 identified by such load IDs 1405 can be provided as a CIDD information 1410 that the load-based CI instruction 706 is a load-based CIDD instruction or provided in a list of load-based CIDD instructions 1412 to the execution circuit 734 for replaying such load-based CI instructions 706 designated as load-based CIDD instructions in misprediction recovery. When the store-based instruction 706 identified by a store ID 1404 in a SFL entry 1502(0)-1502(N) in the SFL tracking memory 1500 becomes non-speculative after its execution, the SLF entry 1502(0)-1502(N) established for such store-based instruction 706 can be de-allocated and such SFL entry 1502(0)-1502(N) freed for another entry.

The control independent determination circuit 1436 in the processor 702 in FIG. 7 can also be configured to search the SFL entries 1502(0)-1502(N) in the SFL tracking memory 1500 when the store-based CD instruction 706 in the mispredicted CD instruction path is taken from predicting a conditional control instruction 706 and the store forward of a store-based load instruction 706 is an active store. In this manner, only load-based instructions 706 that are SFD on active stores would be designated as load-based CIDD instructions for replay.

Also, in this example, and as previously discussed, the control independent determination circuit 1436 in the processor 702 in FIG. 7 can also be configured to determine if a store-based instruction 706 encountered in the instruction stream 714 and contained in an SFL entry 1502(0)-1502(0) in the SFL tracking memory 1500 is older or younger than a conditional control instruction based on their respective store ID 1404 from the SFL tracking circuit 1402 and the instruction ID 1406 in FIG. 14. If the store-based CD instruction 706 is younger by its store ID 1404 than a conditional control instruction, this means that the load-based CI instruction 706 in the load list indicator 1508 in the SFL entry 1502(0)-1502(0) is not SFD on a store-based CD instruction 706 in the CD path taken from a conditional control instruction. Thus in this example, the control independent determination circuit 1436 can override the CIDD designation of the load-based CI instruction 706 in the load list indicator 1508 for the store-based instruction 706 as not being a load-based CIDD instruction or being a load-based CIDI instruction.

Also in this example, and as previously discussed, the control independent determination circuit 1436 in the processor 702 in FIG. 7 can also be configured to determine if a more recent store from a store-based instruction 706 encountered in the instruction stream 714 is older or younger than the load-based CI instructions in its load list indicator 1508. If in a searched valid SFL entry 1502(0)-1502(N) in the SFL tracking memory 1500, the load ID 1405 in the load list indicator 1508 is younger than a most recent committed store ID, the load-based instructions identified by the load ID 1405 will be designated as a load-based CIDD instruction, otherwise it will not be designated as a load-based CIDD instruction.

As previously discussed in the control independent determination circuit 936 in FIG. 9, the control independent determination circuit 936 can track and be consulted to determine if a load-based CI instruction 706 is SFD on a store-based instruction 706 to then be identified as a load-based CIDD instruction for replay in misprediction recovery. The control independent determination circuit 936 could also be configured to establish entries in the store-forward tracking memory 1000 in FIG. 10 based on receive an indication that a load-based instruction 706 is predicated to have a memory dependence on a store-based instruction in lieu of or in addition to receiving the STL information 914 from the STL forwarding circuit 916 as previously discussed in FIG. 9. The tracking of load-based CI instructions 706 predicted to have memory dependence can be tracked as being SFD on a store-based instruction 706 to then be designated as load-based CIDD instructions.

In this regard, FIG. 16 is a schematic diagram illustrating exemplary details of an alternative control independent determination circuit 1636 that can be provided in the processor 702 in FIG. 7 to track CI loads in load-based CI instructions 706 having a predicted store-forward dependence. Common components between the control independent determination circuit 1636 in FIG. 16 and the control independent determination circuit 936 in FIG. 9 are shown with common element numbers. As shown in FIG. 16, a memory dependence predictor circuit 1600 is included in the processor 702 in FIG. 7 in this example and is configured to predict store-forward dependence of a load-based CI instruction 706. When a load-based CI instruction 706 is processed in the instruction stream 714, the memory dependence predictor circuit 1600 predicts if the load-based CI instruction 706 has SFD on a store-based instruction 706. If so, this is communicated to the load memory dependence determination circuit 900, which then establishes a SFL entry 1002(0)-1002(N) in the store-forward tracking memory 1000 in FIG. 10 to track the load-based CI instruction 706 and designates it as being SFD on a store-based instruction 706. In misprediction recovery, the load memory dependence determination circuit 900 can be consulted to determine if a load-based CI instruction 706 is designated as being SFD on a store-based instruction 706. The load memory dependence determination circuit 900 consults the SFL tracking circuit 902 to determine if a SFL entry 1002(0)-1002(N) in the store-forward tracking memory 1000 has a load ID corresponding to the load-based CI instruction 706 to determine if the load-based CI instruction 706 is designated as having a SFD on a store-based instruction 706. The control independent determination circuit 1636 is configured to indicate a load-based CI instruction 706 determined to have been predicted as SFD on a store-based instruction 706 as a load-based CIDD instruction to the execution circuit 734 through the CIDD information 910 or the list of CIDD instructions 912. This is further illustrated in FIGS. 17A and 17B.

In FIG. 17A, an instruction stream 1700 is illustrated that includes a load-based CI instruction 1702 in a CI path 1704. In this example, the load-based CI instruction 1702 loads data from memory location [A] into 'Y'. The load-based CI instruction 1702 is in CI instruction 1706 in a CI instruction region 1708 following a conditional control instruction 1710 and a CD predicted path 1712. When the instruction processing circuit 704 in FIG. 7 encounters the load-based CI instruction 1702 in the instruction stream 714 when the CD predicted path 1712 is taken, the instruction processing circuit 704 can cause the memory dependence predictor circuit 1600 in FIG. 16 to predict if the load-based CI instruction 1702 has a SFD on a store-based instruction. For example, the load-based CI instruction 1702 is memory dependent on a store-based instruction 1714 in a CD actual path 1716 of an instruction stream 1718 in FIG. 17B, which is the correct, CD actual path 1716 to be taken from the conditional control instruction 1710 in misprediction recovery. But, because of the misprediction of the conditional control instruction 1710 as shown in FIG. 17A, the store-based instruction 1714 is not in the instruction stream 1700. The memory dependence prediction of the load-based CI instruction 1702 is provided by the memory dependence predictor circuit 1600 in FIG. 16 to the control independent determination circuit 1636. Thus, as previously discussed above, in misprediction recovery, when the instruction stream 1718 is taken that includes the CD actual path 1716, the load memory dependence determination circuit 900 can be consulted to determine if the load-based CI instruction 1702 is designated as being based on the memory dependence prediction. The control independent determination circuit 1636 is configured to indicate that the load-based CI instruction 1702 was determined to have been predicted as SFD on a store-based instruction 706 as a load-based CIDD instruction to the execution circuit 734 through the CIDD information 910 or the list of CIDD instructions 912.

FIG. 18 is a block diagram of an exemplary processor-based system 1800 that includes a processor 1802 configured to support selective designation of store-forward dependent load-based CI instructions in the CI instruction stream in an instruction pipeline in misprediction recovery as load-based CIDD instructions for replay if the load-based CI instructions are identified as having a store-forward dependency. The processor 1802 can include, without limitation, the processor 702 in FIG. 7. The processor 1802 can include a control independent determination circuit 1804 that is configured to track store-forward dependencies in load-based CI instructions in an instruction pipeline and selectively designate determined store-forward dependent load-based CI instructions in misprediction recovery as load-based CIDD instructions for replay. The control independent determination circuit 1804 can include, without limitation, the control independent determination circuits 736, 936, and 1436 in FIGS. 7, 9, 14, and 16.

The processor-based system 1800 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based system 1800 includes the processor 1802. The processor 1802 represents one or more general-purpose processing circuits, such as a microprocessor, central processing unit, or the like. The processor 1802 is configured to execute processing logic in computer instructions for performing the operations and steps discussed herein. In this example, the processor 1802 includes an instruction cache 1806 for temporary, fast access memory storage of instructions and an instruction processing circuit 1808. Fetched or prefetched instructions from a memory, such as from a system memory 1810 over a system bus 1812, are stored in the instruction cache 1806. The instruction processing circuit 1808 is configured to process instructions fetched into the instruction cache 1806 and process the instructions for execution. The instruction processing circuit 1808 is configured to insert the fetched instructions into one or more instruction pipelines that are then processed to execution. The control independent determination circuit 1804 is communicatively coupled to the control independent determination circuit 1804 to identify load-based CI instructions as having store-forward dependencies to then be able to mark such load-based CI instructions as load-based CIDD instructions for replay depending on the design.

The processor 1802 and the system memory 1810 are coupled to the system bus 1812 and can intercouple peripheral devices included in the processor-based system 1800. As is well known, the processor 1802 communicates with these other devices by exchanging address, control, and data information over the system bus 1812. For example, the processor 1802 can communicate bus transaction requests to a memory controller 1814 in the system memory 1810 as an example of a slave device. Although not illustrated in FIG. 18, multiple system buses 1812 could be provided, wherein each system bus constitutes a different fabric. In this example, the memory controller 1814 is configured to provide memory access requests to a memory array 1816 in the system memory 1810. The memory array 1816 is comprised of an array of storage bit cells for storing data. The system memory 1810 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 1812. As illustrated in FIG. 18, these devices can include the system memory 1810, one or more input device(s) 1818, one or more output device(s) 1820, a modem 1822, and one or more display controllers 1824, as examples. The input device(s) 1818 can include any type of input device, including but not limited to input keys, switches, voice processors, etc. The output device(s) 1820 can include any type of output device, including but not limited to audio, video, other visual indicators, etc. The modem 1822 can be any device configured to allow exchange of data to and from a network 1826. The network 1826 can be any type of network, including but not limited to a wired or wireless network, a private or public network, a local area network (LAN), a wireless local area network (WLAN), a wide area network (WAN), a BLUETOOTH™ network, and the Internet. The modem 1822 can be configured to support any type of communications protocol desired. The processor 1802 may also be configured to access the display controller(s) 1824 over the system bus 1812 to control information sent to one or more displays 1828. The display(s) 1828 can include any type of display, including but not limited to a cathode ray tube (CRT), a liquid crystal display (LCD), a plasma display, etc.

The processor-based system 1800 in FIG. 18 may include a set of instructions 1830 that may include conditional control instructions that cause such instructions to either be CI instructions or CD instructions. The instructions 1830 may be stored in the system memory 1810, processor 1802, and/or instruction cache 1806 as examples of non-transitory computer-readable medium 1832. The instructions 1830 may also reside, completely or at least partially, within the system memory 1810 and/or within the processor 1802 during their execution. The instructions 1830 may further be transmitted or received over the network 1826 via the modem 1822, such that the network 1826 includes the non-transitory computer-readable medium 1832.

While the non-transitory computer-readable medium 1832 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor, comprising:
an instruction processing circuit comprising one or more instruction pipelines;
the instruction processing circuit configured to:
fetch a plurality of instructions from a memory into an instruction pipeline among the one or more instruction pipelines, the plurality of fetched instructions in the one or more instruction pipelines comprising an instruction stream comprising at least one control independent (CI) instruction region and a plurality of control dependent (CD) instruction regions;

speculatively predict a predicate in a conditional control instruction in the instruction stream;

process fetched instructions in the instruction stream comprising fetched instructions in a first CD instruction region among the plurality of CD instruction regions in the instruction stream taken based on the speculative prediction and a load-based CI instruction in a CI instruction region;

determine if the load-based CI instruction is a store-forward dependent (SFD) load-based CI instruction based on tracking if a store-based instruction in the instruction stream actually designates a forward store for consumption by the load-based CI instruction;

execute the conditional control instruction to resolve the predicate of the conditional control instruction;

determine if the speculative prediction matches the resolved predicate from execution of the conditional control instruction; and in response to the speculative prediction not matching the resolved predicate in execution of the conditional control instruction:
 process the fetched instructions in a second CD instruction region among the plurality of CD instruction regions in the instruction stream taken based on the resolved predicate from execution of the conditional control instruction and the load-based CI instruction;
 in response to determining the load-based CI instruction is a SFD load-based CI instruction, replay the processed load-based CI instruction.

2. The processor of claim 1, wherein the instruction processing circuit is further configured to, in response to determining the processed load-based CI instruction is not a SFD load-based CI instruction, not replay the processed load-based CI instruction.

3. The processor of claim 1, wherein the instruction processing circuit is configured to:
 in response to determining the load-based CI instruction is a SFD load-based CI instruction, designate the processed load-based CI instruction as a load-based CIDD instruction;
 in response to the speculative prediction not matching the resolved predicate, in response to the load-based CI instruction being designated as a load-based CIDD instruction, replay the processed load-based CI instruction.

4. The processor of claim 3, wherein the instruction processing circuit is further configured to:
 in response to determining the load-based CI instruction is not a SFD load-based CI instruction, designate the processed load-based CI instruction as a load-based CI, data independent (CIDI) instruction;
 in response to the speculative prediction not matching the resolved predicate, in response to the load-based CI instruction being designated as a load-based CIDI instruction, not replay the processed load-based CI instruction.

5. The processor of claim 1, wherein the instruction processing circuit is configured to:
 determine if the processed load-based CI instruction is the SFD load-based CI instruction by being configured to determine if a store forwarded by the store-based instruction in the instruction stream is in the first CD instruction region; and
 in response to determining the load-based CI instruction is a SFD load-based CI instruction, replay the processed load-based CI instruction.

6. The processor of claim 1, wherein the instruction processing circuit is configured to:
 determine if the processed load-based CI instruction is the SFD load-based CI instruction by being configured to determine if an active store forwarded by the store-based instruction in the instruction stream is in the first CD instruction region; and
 in response to determining the load-based CI instruction is a SFD load-based CI instruction, replay the processed load-based CI instruction.

7. The processor of claim 6, wherein, in response to the instruction processing circuit determining the processed load-based CI instruction is not dependent on an active store forwarded by the store-based instruction in the first CD instruction region, not replay the load-based CI instruction.

8. The processor of claim 1, wherein the instruction processing circuit is further configured to:
 in response to determining the load-based CI instruction is a SFD load-based CI instruction, determine if the processed load-based CI instruction is older than the conditional control instruction in the instruction stream; and
 in response to determining the processed load-based CI instruction is older than the conditional control instruction in the instruction stream, replay the processed load-based CI instruction.

9. The processor of claim 8, wherein the instruction processing circuit is configured to, in response to determining the processed load-based CI instruction is not older than the conditional control instruction in the instruction stream, not replay the load-based CI instruction.

10. The processor of claim 1, wherein the instruction processing circuit is further configured to:
 in response to determining the load-based CI instruction is a SFD load-based CI instruction, determine if the store-based instruction is younger than a most recent committed store-based instruction in the instruction stream by the instruction processing circuit; and
 in response to determining the store-based instruction is younger than the most recent committed store-based instruction in the instruction stream, replay the processed load-based CI instruction.

11. The processor of claim 10, wherein the instruction processing circuit is configured to, in response to determining the store-based instruction is not younger than the most recent committed store-based instruction in the instruction stream, not replay the processed load-based CI instruction.

12. The processor of claim 3, wherein the instruction processing circuit further comprises:
 a store-forward load (SFL) tracking circuit configured to store at least one SFL entry each comprising SFL information for a load-based instruction; and
 a control independent determination circuit coupled to the SFL tracking circuit and coupled to the one or more instruction pipelines;
 the control independent determination circuit configured to:
  determine if the load-based CI instruction is a SFD load-based CI instruction based on tracking if a store forwarded by a store-based instruction in the instruction stream is actually designated as a forward store for consumption by the load-based CI instruction;

in response to determining the load-based CI instruction is a SFD load-based CI instruction, store SLF information in a SFL entry among the at least one SFL entry in the SFL tracking circuit designating the load-based CI instruction as a load-based CIDD instruction; and in response to the speculative prediction not matching the resolved predicate in execution of the conditional control instruction:

determine if the load-based CI instruction is a SFD load-based CI instruction based on the SFL information in the SFL entry in the SFL tracking circuit for the load-based CI instruction; and in response to determining the load-based CI instruction is a SFD load-based CI instruction based on the SFL entry in the SFL tracking circuit, designate the load-based CI instruction as a load-based CIDD instruction.

13. The processor of claim 12, wherein the instruction processing circuit further comprises:

wherein the SFL information comprises a load identification (ID) indicator identifying a load-based instruction, a SFL indicator indicating if the load-based instruction consumes a store-forwarded load produced by the store-based instruction, and a forward store indicator (FSID) identifying the store-based instruction producing the store-forwarded to the executed load-based CI instruction; and the control independent determination circuit configured to:

in response to determining the load-based CI instruction is a SFD load-based CI instruction, store SLF information in the SFL entry among the at least one SFL entry in the SLF tracking circuit comprising storing the load ID of the load-based CI instruction in the load ID indictor in the SFL entry, a SFL true state in the SLF indicator in the SFL entry, and the store ID of the store-based instruction in the FSID indictor in the SFL entry; and in response to the speculative prediction not matching the resolved predicate in execution of the conditional control instruction:

determine if the load-based CI instruction is a SFD load-based CI instruction based on the SFL entry for the load-based CI instruction in the SFL tracking circuit; and in response to determining the SLF indicator in the SFL entry for the load ID of the load-based CI instruction in the SFL tracking circuit is a SFL true state, designate the load-based CI instruction as a load-based CIDD instruction.

14. The processor of claim 13, wherein the control independent determination circuit is further configured to, in response to determining the SLF indicator in the SFL entry for the load ID of the load-based CI instruction in the SFL tracking circuit is a SFL false state, not designate the load-based CI instruction as a load-based CIDD instruction.

15. The processor of claim 13, wherein the control independent determination circuit is configured to determine if the processed load-based CI instruction is the SFD load-based CI instruction by being configured to determine if a store forwarded by the store-based instruction in the instruction stream is in the first CD instruction region.

16. The processor of claim 13, wherein:

the control independent determination circuit is further configured to receive an instruction ID of the conditional control instruction; and the control independent determination circuit is configured to:

determine if the processed load-based CI instruction is the SFD load-based CI instruction, by being configured to determine if the load ID in the SFL entry of the load-based CI instruction in the SFL tracking circuit is younger than the instruction ID of the conditional control instruction; and in response to determining the load ID of the SFD load-based CI instruction is younger than the instruction ID of the conditional control instruction in the instruction stream, designate the SFD load-based CI instruction as a load-based CIDD instruction.

17. The processor of claim 13, wherein the control independent determination circuit is configured to:

determine if the processed load-based CI instruction is the SFD load-based CI instruction, by being configured to determine if the store-based instruction is younger than a most recent committed store-based instruction in the instruction stream by the instruction processing circuit, based on determining if an FSID ID in the SFL entry for the load-based CI instruction in the SFL tracking circuit is less than an ID of most recent committed store-based instruction; and in response to determining the store-based instruction is younger than the most recent committed store-based instruction in the instruction stream, designate the load-based CI instruction as a load-based CIDD instruction.

18. The processor of claim 1, wherein the instruction processing circuit further comprises:

a store-forward load (SFL) tracking circuit configured to store at least one SFL entry each comprising SFL information for a store-based instruction; and a control independent determination circuit coupled to the SFL tracking circuit and coupled to the one or more instruction pipelines;

the control independent determination circuit configured to:

determine if a fetched store-based instruction in the instructions stream has a SFL dependence with a load-based instruction;

in response to determining the fetched store-based instruction has a SFL dependence with the load-based CI instruction, store SFL information in a SFL entry among the at least one SFL entry in the SFL tracking circuit comprising designating the store-based CI instruction as a store-forward (SF) store-based instruction and a load ID of the load-based CI instruction having the SFL dependence with the store-based instruction;

in response to the speculative prediction not matching the resolved predicate in execution of the conditional control instruction:

determine if the load-based CI instruction is contained in a SFL entry in the SFL tracking circuit as a SFD load-based CI instruction to the store-based instruction based on the load ID of the load-based CI instruction in the SFL tracking circuit; and in response to determining the load-based CI instruction is a SFD load-based CI instruction based on the SFL entry in the SFL tracking circuit, designate the load-based CI instruction as a load-based CIDD instruction.

19. The processor of claim 18, wherein the control independent determination circuit is configured to:
   determine if the processed load-based CI instruction is the SFD load-based CI instruction, by being further configured to determine if a store forwarded by the store-based instruction in the instruction stream is in the first CD instruction region; and
   in response to determining the load-based CI instruction is a SFD load-based CI instruction based on the SFL entry in the SFL tracking circuit and the store-based instruction is in the first CD instruction region, designate the load-based CI instruction as a load-based CIDD instruction.

20. The processor of claim 18, wherein:
   the control independent determination circuit is further configured to receive an instruction ID of the conditional control instruction; and
   the control independent determination circuit is configured to:
      determine if the processed load-based CI instruction is the SFD load-based CI instruction by being further configured to determine if the load ID in the SFL entry in the SFL tracking circuit is less than the instruction ID of the conditional control instruction; and
      in response to determining the load-based CI instruction is a SFD load-based CI instruction based on the SFL entry in the SFL tracking circuit and the store-based instruction is in the first CD instruction region, designate the SFD load-based CI instruction as a load-based CIDD instruction.

21. The processor of claim 18, wherein the control independent determination circuit is configured to:
   determine if the processed load-based CI instruction is the SFD load-based CI instruction, by being further configured to determine if the store-based instruction is younger than a most recent committed store-based instruction in the instruction stream, based on determining if an FSID ID in the SFL entry for the load-based CI instruction in the SFL tracking circuit is less than an ID of most recent committed store-based instruction; and
   in response to determining the load-based CI instruction is a SFD load-based CI instruction based on the SFL entry in the SFL tracking circuit and determining the store-based instruction is younger than the most recent committed store-based instruction in the instruction stream, designate the load-based CI instruction as a load-based CIDD instruction.

22. A method of designating load-based control independent (CI) instructions in an instruction stream in a processor as load-based CI, data dependent (DD) (CIDD) instructions for replay in misprediction recovery, comprising:
   fetching a plurality of instructions from a memory into an instruction pipeline among the one or more instruction pipelines, the plurality of fetched instructions in the one or more instruction pipelines comprising an instruction stream comprising at least one control independent (CI) instruction region and a plurality of control dependent (CD) instruction regions;
   speculatively predicting a predicate in a conditional control instruction in the instruction stream;
   processing fetched instructions in the instruction stream comprising fetched instructions in a first CD instruction region among the plurality of CD instruction regions in the instruction stream taken based on the speculative prediction and a load-based CI instruction in a CI instruction region;
   determining if the load-based CI instruction is a store-forward dependent (SFD) load-based CI instruction based on tracking if a store-based instruction in the instruction stream actually designates a forward store for consumption by the load-based CI instruction;
   executing the conditional control instruction to resolve the predicate of the conditional control instruction;
   determining if the speculative prediction matches the resolved predicate from execution of the conditional control instruction; and
   in response to the speculative prediction not matching the resolved predicate in execution of the conditional control instruction:
      processing the fetched instructions in a second CD instruction region among the plurality of CD instruction regions in the instruction stream taken based on the resolved predicate from execution of the conditional control instruction and the load-based CI instruction; and
      replaying the processed load-based CI instruction in response to determining the load-based CI instruction is a SFD load-based CI instruction.

23. The method of claim 22, further comprising not replaying the processed load-based CI instruction, in response to determining the processed load-based CI instruction is not a SFD load-based CI instruction.

24. The method of claim 22, comprising:
   determine if the processed load-based CI instruction is the SFD load-based CI instruction by determining if a store forwarded by the store-based instruction in the instruction stream is in the first CD instruction region; and
   replaying the processed load-based CI instruction in response to determining the load-based CI instruction is a SFD load-based CI instruction.

25. The method of claim 22, further comprising:
   determining if the processed load-based CI instruction is older than the conditional control instruction in the instruction stream in response to determining the load-based CI instruction is a SFD load-based CI instruction; and
   comprising replaying the processed load-based CI instruction in response to determining the processed load-based CI instruction is older than the conditional control instruction in the instruction stream.

26. The method of claim 22, further comprising:
   determining if the store-based instruction is younger than a most recent committed store-based instruction in the instruction stream by the instruction processing circuit, in response to determining the load-based CI instruction is a SFD load-based CI instruction; and
   comprising replaying the processed load-based CI instruction in response to determining the store-based instruction is younger than the most recent committed store-based instruction in the instruction stream.

27. A processor, comprising:
   an instruction processing circuit comprising one or more instruction pipelines;
   the instruction processing circuit configured to:
      fetch a plurality of instructions from a memory into an instruction pipeline among the one or more instruction pipelines, the plurality of fetched instructions in the one or more instruction pipelines comprising an instruction stream comprising at least one control independent (CI) instruction region and a plurality of control dependent (CD) instruction regions;
speculatively predict a predicate in a conditional control instruction in the instruction stream;
process fetched instructions in the instruction stream comprising fetched instructions in a first CD instruction region among the plurality of CD instruction regions in the instruction stream taken based on the speculative prediction and a load-based CI instruction in a CI instruction region;
determine if the load-based CI instruction is predicted to have a memory dependence on a store-based instruction in the instruction stream based on tracking if a store-based instruction in the instruction stream actually designates a forward store for consumption by the load-based CI instruction;
execute the conditional control instruction to resolve the predicate of the conditional control instruction;
determine if the speculative prediction matches the resolved predicate from execution of the conditional control instruction; and
in response to the speculative prediction not matching the resolved predicate in execution of the conditional control instruction:
process the fetched instructions in a second CD instruction region among the plurality of CD instruction regions in the instruction stream taken based on the resolved predicate from execution of the conditional control instruction and the load-based CI instruction;
determine if the load-based CI instruction had the predicted memory dependence as a store-forward dependent (SFD) load-based CI instruction; and
in response to determining the load-based CI instruction had the predicted memory dependence as the SFD load-based CI instruction, replay the executed load-based CI instruction as a load-based CI, data dependent (DD) (CIDD) instruction.

28. The processor of claim 27, wherein the instruction processing circuit is further configured to, in response to determining the load-based CI instruction is not predicted to have the memory dependence on the store-based instruction, not replay the load-based CI instruction as a load-based CIDD instruction.

29. The processor of claim 27, further comprising:
a control independent determination circuit coupled to the one or more instruction pipelines; and
a memory dependence predictor circuit configured to indicate if a load-based instruction is predicted to have a memory dependence on a store-based instruction in the instruction stream;
a control independent determination circuit coupled to the SFL tracking circuit and coupled to the one or more instruction pipelines;
the instruction processing circuit configured to:
determine if the load-based CI instruction is predicted to have the memory dependence on a store-based instruction in the instruction stream based on the memory dependence predictor circuit; and
in response to determining the load-based CI instruction is predicted to have the memory dependence on a store-based instruction in the instruction stream, replay the load-based CI instruction as a load-based CIDD instruction.

* * * * *